US012028409B1

(12) United States Patent
Robles et al.

(10) Patent No.: US 12,028,409 B1
(45) Date of Patent: *Jul. 2, 2024

(54) COARSE VALUES FOR ESTIMATING LESS-THAN-CRITICAL RESOURCES

(71) Applicant: Avalara, Inc., Seattle, WA (US)

(72) Inventors: Aaron Lee Robles, Bainbridge Island, WA (US); Nikki Nash, Bremerton, WA (US); Mark Janzen, Wichita, KS (US); Rahul Aggarwal, Maharashtra (IN); Gregory T. Kavounas, Bellevue, WA (US); Hemendra Pal, Medina, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,526

(22) Filed: Mar. 14, 2023

Related U.S. Application Data

(63) Continuation of application No. 17/127,205, filed on Dec. 18, 2020, now Pat. No. 11,632,419.

(60) Provisional application No. 62/950,284, filed on Dec. 19, 2019.

(51) Int. Cl.
*H04L 67/10* (2022.01)
*G06F 9/50* (2006.01)

(52) U.S. Cl.
CPC ............ *H04L 67/10* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 5,335,169 | A | 8/1994 | Chong |
| 6,236,365 | B1 | 5/2001 | Leblanc et al. |
| 6,993,502 | B1 | 1/2006 | Gryglewicz et al. |
| 7,200,569 | B2 | 4/2007 | Gallagher et al. |

(Continued)

FOREIGN PATENT DOCUMENTS

WO 2013/163625 A1 10/2013

OTHER PUBLICATIONS

"Sales and Transactions Checker for Economic Nexus," TaxJar, Feb. 19, 2019, https://www.taxjar.com/sales-and-transactions-checker/, 8 pages.

(Continued)

*Primary Examiner* — June Sison
(74) *Attorney, Agent, or Firm* — Jeremiah J. Baunach; VLP Law Group LLP

(57) ABSTRACT

Systems and methods electronically produce a local estimate of less-than-critical resources based on a client side version of digital rules and a coarse values received from an online service provider. Although using the client side version of digital rules and the coarse values may not include all the parameters and values needed to provide a fully accurate estimate of the resource, the ability to locally estimate resources without having to make network calls to the online service provider, such as when there are unfavorable conditions or latency of the network, imminent overloading of the online service provider or other operating conditions or demands on the online service provider preventing it from producing a timely more accurate estimate, provides a faster and more efficient way of obtaining a potentially useful estimate of resources.

23 Claims, 17 Drawing Sheets

(56) References Cited

U.S. PATENT DOCUMENTS

| | | |
|---|---|---|
| 7,257,553 B1 | 8/2007 | Baker |
| 7,337,910 B2 | 3/2008 | Cartmell et al. |
| 7,516,242 B2 | 4/2009 | Furukawa et al. |
| 7,783,536 B2 | 8/2010 | William et al. |
| 7,933,803 B1 | 4/2011 | Nadler et al. |
| 7,945,536 B2 | 5/2011 | Bao et al. |
| 8,099,342 B1 | 1/2012 | Christian et al. |
| 8,386,344 B2 | 2/2013 | Christian et al. |
| 8,458,337 B2 | 6/2013 | Corley et al. |
| 8,526,405 B2 | 9/2013 | Curtis et al. |
| 8,528,047 B2 | 9/2013 | Terzis et al. |
| 8,613,044 B2 | 12/2013 | Casey et al. |
| 8,620,578 B1 | 12/2013 | Brown et al. |
| 8,725,407 B2 | 5/2014 | Hurley et al. |
| 8,751,399 B2 | 6/2014 | Kolhatkar et al. |
| 8,849,862 B2 | 9/2014 | Scott |
| 8,904,493 B1 | 12/2014 | Dibble |
| 9,101,834 B2 | 8/2015 | Letourneau et al. |
| 9,323,428 B1 | 4/2016 | Maguire et al. |
| 9,342,367 B2 | 5/2016 | Koneti et al. |
| 9,613,190 B2 | 4/2017 | Ford et al. |
| 9,760,915 B2 | 9/2017 | Pavlou et al. |
| 9,762,553 B2 | 9/2017 | Ford et al. |
| 10,033,702 B2 | 7/2018 | Ford et al. |
| 10,332,216 B2 | 6/2019 | Barsade et al. |
| 10,374,968 B1 | 8/2019 | Duerk et al. |
| 10,445,818 B1 | 10/2019 | Chowdhary |
| 10,572,684 B2 | 2/2020 | Afever et al. |
| 10,572,953 B1 | 2/2020 | Char et al. |
| 10,614,130 B1 | 4/2020 | Pai et al. |
| 10,628,582 B2 | 4/2020 | Reybok et al. |
| 10,764,254 B2 | 9/2020 | Ford et al. |
| 10,769,611 B2 | 9/2020 | McNeel |
| 10,789,590 B2 | 9/2020 | Tran et al. |
| 10,872,100 B1 | 12/2020 | Shefferman et al. |
| 11,176,620 B1 | 11/2021 | Lubczynski et al. |
| 11,238,542 B1 | 2/2022 | Wixted et al. |
| 11,455,410 B2 | 9/2022 | Turgeman et al. |
| 11,475,430 B2 | 10/2022 | Burton et al. |
| 11,514,448 B1 | 11/2022 | Liberman |
| 2001/0005675 A1 | 6/2001 | Aho |
| 2001/0034767 A1 | 10/2001 | Aho |
| 2002/0116456 A1 | 8/2002 | Morita |
| 2002/0138649 A1 | 9/2002 | Cartmell et al. |
| 2002/0138765 A1 | 9/2002 | Fishman et al. |
| 2003/0055754 A1 | 3/2003 | Sullivan |
| 2003/0093320 A1 | 5/2003 | Sullivan |
| 2003/0101112 A1 | 5/2003 | Gallagher et al. |
| 2003/0144931 A1 | 7/2003 | Stokes et al. |
| 2004/0004967 A1 | 1/2004 | Nakatsugawa et al. |
| 2004/0083306 A1 | 4/2004 | Gloe |
| 2004/0179539 A1 | 9/2004 | Takeda et al. |
| 2004/0215707 A1 | 10/2004 | Fujita et al. |
| 2005/0125335 A1 | 6/2005 | Bross et al. |
| 2005/0255811 A1 | 11/2005 | Allen et al. |
| 2006/0053208 A1 | 3/2006 | Laurila et al. |
| 2006/0085275 A1 | 4/2006 | Stokes et al. |
| 2006/0235776 A1 | 10/2006 | Temme |
| 2006/0282900 A1 | 12/2006 | Johnson et al. |
| 2007/0073892 A1 | 3/2007 | Laurila et al. |
| 2007/0124294 A1 | 5/2007 | Sun et al. |
| 2007/0136158 A1 | 6/2007 | Rawlings et al. |
| 2007/0136159 A1 | 6/2007 | Rawlings et al. |
| 2007/0136475 A1 | 6/2007 | Leppisaari et al. |
| 2007/0203718 A1 | 8/2007 | Merrifield, Jr. |
| 2007/0239464 A1 | 10/2007 | Carroll |
| 2008/0104124 A1 | 5/2008 | Bao et al. |
| 2008/0154754 A1 | 6/2008 | William et al. |
| 2009/0006467 A1 | 1/2009 | Scott |
| 2009/0024698 A1 | 1/2009 | Ho et al. |
| 2009/0067395 A1 | 3/2009 | Curtis et al. |
| 2009/0076965 A1 | 3/2009 | Elson et al. |
| 2009/0082008 A1 | 3/2009 | Thorell |
| 2009/0138307 A1 | 5/2009 | Belcsak et al. |
| 2009/0187500 A1 | 7/2009 | Wilson et al. |
| 2009/0279455 A1 | 11/2009 | Wang et al. |
| 2010/0095359 A1 | 4/2010 | Gordon |
| 2010/0211634 A1 | 8/2010 | Song et al. |
| 2011/0187864 A1 | 8/2011 | Snider |
| 2012/0011518 A1 | 1/2012 | Duan et al. |
| 2012/0179801 A1 | 7/2012 | Luna et al. |
| 2012/0239731 A1 | 9/2012 | Shyamsunder et al. |
| 2013/0013471 A1 | 1/2013 | Fishman |
| 2013/0061179 A1 | 3/2013 | Alletto et al. |
| 2013/0086380 A1 | 4/2013 | Krishnaswamy et al. |
| 2013/0191883 A1 | 7/2013 | Tung |
| 2013/0268357 A1 | 10/2013 | Heath |
| 2013/0281115 A1 | 10/2013 | Dupray et al. |
| 2013/0290200 A1 | 10/2013 | Singhal et al. |
| 2013/0317944 A1 | 11/2013 | Huang et al. |
| 2013/0346608 A1 | 12/2013 | Tung |
| 2014/0094199 A1 | 4/2014 | Palanki et al. |
| 2014/0172526 A1 | 6/2014 | Arrocho et al. |
| 2014/0172656 A1 | 6/2014 | Shaw |
| 2014/0222524 A1 | 8/2014 | Pluschkell et al. |
| 2014/0289386 A1 | 9/2014 | Vatto et al. |
| 2014/0337189 A1 | 11/2014 | Barsade et al. |
| 2014/0351105 A1 | 11/2014 | Hamm |
| 2015/0019591 A1 | 1/2015 | Scott |
| 2015/0058931 A1 | 2/2015 | Miu et al. |
| 2015/0163206 A1 | 6/2015 | McCarthy et al. |
| 2015/0310188 A1 | 10/2015 | Ford et al. |
| 2016/0042466 A1 | 2/2016 | Herndon et al. |
| 2016/0062949 A1 | 3/2016 | Smith et al. |
| 2016/0099963 A1 | 4/2016 | Mahaffey et al. |
| 2016/0140668 A1 | 5/2016 | Maguire et al. |
| 2016/0179874 A1 | 6/2016 | Lynch |
| 2017/0041296 A1 | 2/2017 | Ford et al. |
| 2017/0140471 A1 | 5/2017 | Hemberg et al. |
| 2017/0142076 A1 | 5/2017 | Ford et al. |
| 2017/0272316 A1 | 9/2017 | Johnson et al. |
| 2017/0272485 A1 | 9/2017 | Gordon et al. |
| 2017/0330121 A1 | 11/2017 | Sullivan et al. |
| 2018/0096175 A1 | 4/2018 | Schmeling et al. |
| 2018/0150647 A1 | 5/2018 | Naqvi et al. |
| 2018/0176099 A1 | 6/2018 | Guo et al. |
| 2018/0246479 A1 | 8/2018 | Judd et al. |
| 2018/0367506 A1 | 12/2018 | Ford et al. |
| 2019/0114609 A1 | 4/2019 | Burton et al. |
| 2019/0222560 A1 | 7/2019 | Ford et al. |
| 2019/0332807 A1 | 10/2019 | Lafever et al. |
| 2020/0328951 A1 | 10/2020 | Ramprakash |
| 2020/0349572 A1 | 11/2020 | O'Sullivan et al. |
| 2020/0356974 A1 | 11/2020 | McNeel |
| 2020/0387896 A1 | 12/2020 | Tran et al. |
| 2021/0082051 A1 | 3/2021 | Moses |
| 2021/0158456 A1 | 5/2021 | Morgan et al. |
| 2021/0233181 A1 | 7/2021 | Bubalo et al. |
| 2023/0254268 A1* | 8/2023 | Therrien ............... G06Q 40/12 709/226 |

OTHER PUBLICATIONS

"What is Nexus?" Sales Tax Institute, Aug. 26, 2019, https://www.salestaxinstitute.com/sales_tax_faqs/what_is_nexus, 6 pages.

Deseir, "Digital Transformation Challenges in Large and Complex Organizations", 2018.

Ellen Wixted et al., "Online Interactive Notification Platform for Exploring Possible Tax Nexus and Implications," U.S. Appl. No. 16/775,771, filed Jan. 29, 2020. (111 pages).

International Preliminary Report on Patentability received for PCT Patent Application No. PCT/US2021/040168, mailed on Jan. 12, 2023, 9 pages.

International Search Report and Written Opinion received for PCT Patent Application No. PCT/US2021/040168, mailed on Oct. 22, 2021, 10 pages.

MacCarrone, "The Impact of the U.S. Supreme Court's Decision in *South Dakota* v. *Wayfair*," 2021, retrieved from https://www.cpajournal.com/2021/04/26/the-impace-of-the-u-s-supreme-courts-decision-in-south-dakota-v-wayfair/, 11 pages.

Morgan et al., "Assembling Parameters to Compute Taxes for Cross-Border Sales," U.S. Appl. No. 16/696,062, filed Nov. 26, 2019, 75 pages.

(56) References Cited

OTHER PUBLICATIONS

Nash, Nikki, et al., "Automatically Starting Activities Upon Crossing Threshold", U.S. Appl. No. 17/338,220, filed Jun. 3, 2021, 107 pages.

Pichan et al., "Cloud Forensics: Technical Challenges, solutions, and comparative analysis", Digital Investigation, vol. 13, Jun. 2015, pp. 38-57.

Sales Tax Institute, "How do I know if I should be collecting tax in a state", Sales Tax Institute, Aug. 12, 2017, 2 pages.

Seth Therrien et al., "Tax Nexus Notification Platform," U.S. Appl. No. 16/585,829, filed Sep. 27, 2019. (72 pages).

Smith, "Due Process Implications Related to State Notice and Economic Nexus Laws," Tax Lawyer 70(4):833-868, 2017.

Stefan Kim et al., "Disestablishing Entity's Selected Resource Computation in Response to Loss of Nexus Establishment Condition for Selected Domain," U.S. Appl. No. 16/834,934, filed Mar. 30, 2020. (63 pages).

Taxconnex, "Sales Tax Nexus Guide", taxconnex, Whitepaper, 2019, 18 pages.

The Seller's Guide to eCommerce Sales Tax, TaxJar, Jun. 18, 2019, https://www.taxjar.com/guides/intro-to-sales-tax/, 19 pages.

Yetter, "Sales Tax Institute helps you understand sales and use tax obligations," YouTube Video, Dec. 15, 2011, URL= https://www.youtube.com/watch?v=gKFe1W062Ok&feature=emb_logo, download date Sep. 10, 2019, 1 page. (Screenshot).

Hu et al., "Game Theoretic Analysis for Offense—Defense Challenges of Algorithm Contests on TopCoder", 2015 IEEE Symposium on Science Oriented System Engineering Mar. 2015, IEEE Publiishing.

\* cited by examiner

1900

| ZIP_CODE (1902) | STATE_ABBREV (1904) | RESOURCE_RATE (1906) |
|---|---|---|
| 85001 | AZ | 0.82 |
| 85002 | AZ | 0.83 |
| 85003 | AZ | 0.79 |
| 85004 | AZ | 0.82 |

| ZIP_CODE (1902) | STATE_ABBREV (1904) | RESOURCE_RATE_HIGH (2002) | RESOURCE_RATE_LOW (2004) | NEXUS (2006) |
|---|---|---|---|---|
| 85001 | AZ | 0.086 | 0.079 | N |
| 85002 | AZ | 0.086 | 0.079 | Y |
| 85003 | AZ | 0.086 | 0.079 | Y |
| 85004 | AZ | 0.086 | 0.079 | Y |

FIGURE 20

COARSE VALUES FOR ESTIMATING LESS-THAN-CRITICAL RESOURCES

CROSS-REFERENCE TO RELATED APPLICATION

This application claims the benefit, as a continuation application under 35 U.S.C. 120, to U.S. application Ser. No. 17/127,205, filed Dec. 18, 2020, and titled, "COARSE VALUES FOR ESTIMATING LESS-THAN-CRITICAL RESOURCES," which further claims priority under 35 U.S.C. 119 to provisional application No. 62/950,284, filed Dec. 19, 2019, and titled "USING FILE WITH COARSE RULES FOR APPROXIMATE ESTIMATES."

TECHNICAL FIELD

The technical field relates to computer networks, and particularly to networked automated systems for estimating less-than-critical resources.

BRIEF SUMMARY

The present description gives instances of computer systems, devices and storage media that may store programs and methods. Embodiments of the system may produce a local estimate of less-than-critical resources based on a client side version of digital rules and a coarse values received from an online service provider. Although using the client side version of digital rules and the coarse values may not include all the parameters and values needed to provide a fully accurate estimate of the resource, the ability to locally estimate resources without having to make network calls to the online service provider provides a faster and more efficient way of obtaining a potentially useful estimate of resources. For example, this functionality to locally estimate resources may provide a faster and more efficient way of obtaining a potentially useful estimate of resources when there are unfavorable conditions or latency of the network, imminent overloading of the online service provider or other operating conditions or demands on the online service provider preventing it from producing a timely more accurate estimate.

In addition, providing the coarse values instead of a set of values that includes all the parameters and values needed to provide a fully accurate estimate of the resource reduces the data package size that needs to be distributed to clients, thus making it more efficiently and easily deployable to the client computer systems. In various embodiments, the system may also provide the client with a selectable option to produce the local estimate without having to make one or more network calls to the online service provider and/or produce the more accurate estimate via one or more immediate or follow-up network calls to the online service provider. This reduces internet traffic and it can be critical when the internet is down or slow, and the results of the computations are needed in real time. Also, producing the more accurate estimate may be made via one or more follow-up network calls to the online service provider after producing the local estimate when network and operating conditions of the online service provider are more favorable for doing so. Using the more accurate estimates, the system may then perform reconciliation with local estimates to find discrepancies between the local estimates and the more accurate estimates for the system to learn from such discrepancies and automatically implement improvements in how the local estimates are computed.

Therefore, the systems and methods described herein for using coarse values for estimating less-than-critical resources improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 19 is a diagram showing example of parameters and associated parameter values that may be included in a CVF of a system for estimating less-than-critical resources that is an improvement in automated computerized systems, according to embodiments of the present disclosure.

FIG. 20 is a diagram showing another example of parameters and associated parameter values that may be included in a CVF of a system for estimating less-than-critical resources that is an improvement in automated computerized systems, according to embodiments of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
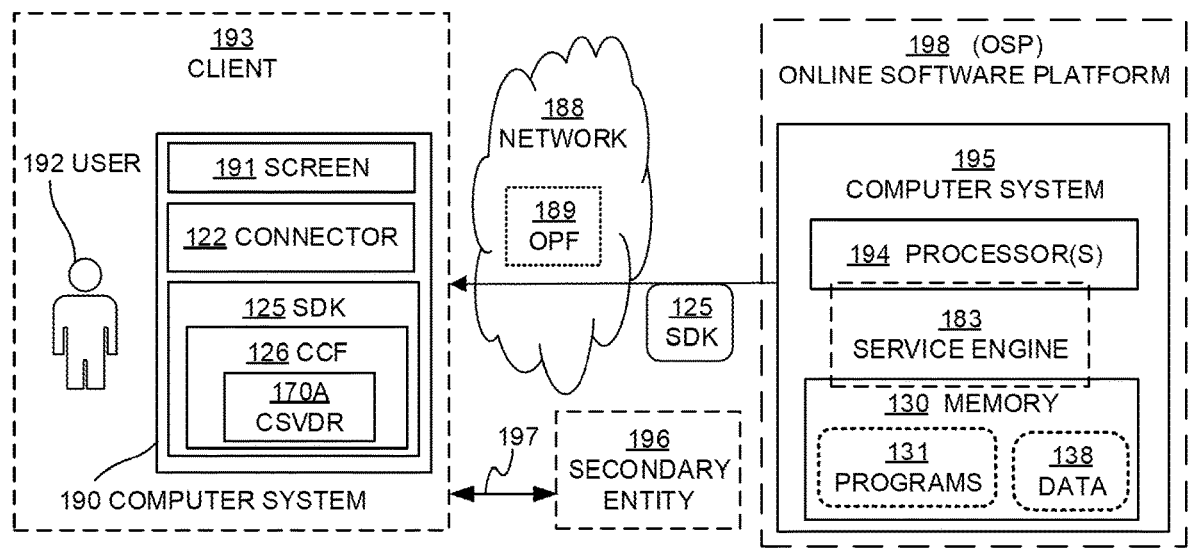
FIG. 1 is a diagram showing sample aspects of embodiments of the present disclosure involving a client receiving a software development kit (SDK) including client-side versions of digital rules (CSVDR) that is an improvement in automated computerized systems.

FIG. 1 is a diagram showing sample aspects of embodiments of the present disclosure involving a client 193 receiving a software development kit (SDK) 125 including client-side versions of digital rules (CSVDR) 170A, which is an improvement in automated computerized systems.

A sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183. One or more of the components of the computer system 195 may also be present in client computer system 190 of client 193 for performing the operations and implementing the functionality of computer system 190 described herein.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: generation and delivery of a software development kit (SDK) 125 for the client 193 to perform local estimates of resources, generation and delivery of a coarse values file (CVF) for the client 193 to perform local estimates of resources, searches, determinations, computations, verifications, notifications, the transmission of specialized information (including digital rules for estimating resources and data that effectuates payments, or remits resources), performing more accurate estimations of resources, determining discrepancies between resources estimated by client computer system 190 and the more accurate estimation of resources performed by the OSP 198, the generation and transmission of documents, the online accessing of other systems to determine digital rules, and so on, including what is described in this document. Such services can be provided as a Software as a Service (SaaS). The SDK 125 may be a collection of software development tools in one package installable by the client computer system 190. The SDK 125 may facilitate the creation of applications, such as the CCF 126 by having a compiler, debugger and a software framework. The SDK 125 may include libraries, documentation, code samples, processes, and guides that the client 193 can use and integrate with the connector 122 and other applications of the computer system 190 to facilitate the computer system 190 performing local estimates of resources.

A user 192 may be standalone. The user 192 may use a computer system 190 that has a screen 191, on which user interfaces (UIs) may be shown. In embodiments, the user 192 and the computer system 190 are considered part of a client 193, which can be referred to also merely as entity. In such instances, the user 192 can be an agent of the client 193, and even within a physical site of the client 193, although that is not necessary. In embodiments, the computer system 190 or other device of the user 192 or the client 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, cable and/or satellite systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically. The computer system 190 and the computer system 195 may exchange requests and responses with each other. Such can be implemented with a number of architectures.

In one such architecture, a device remote to the service engine 183, such as computer system 190, may have a certain application, such as a client computing facility (CCF) 126 and an associated connector 122 that is integrated with, sits on top of, or otherwise works with that certain application. The connector 122 may be able to fetch from a remote device, such as the computer system 195, the details required for the service desired from the OSP 198. The computer system 190 may receive, via network 188, an SDK 125 from the OSP 198 that includes the CCF 126 and/or the connector 122. The OSP 198 may prepare and send the CCF 126 as part of the SDK 125 automatically or in response to a request from the client computer system 190. In requesting services from the OSP 198, the client computer system 190 may form an object or payload, and then send or push a request that carries the payload to the service engine 183 via a service call. The service engine 183 may receive the request with the payload. The service engine 183 may then apply digital rules to the payload to determine a requested resource, including producing an estimate of a resource, form a payload that is an aspect of the resource (e.g., that includes the estimate) and then push, send, or otherwise cause to be transmitted a response that carries the payload to the connector 122. The connector reads the response, and forwards the payload to the certain application, such as the CCF 126.

In some embodiments, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. In some embodiments, this architecture enables the client 193 to directly consume a REST API from their particular application (e.g., CCF 126), without using a connector 122. The particular application of the remote device may be able to fetch internally from the remote device the details required for the service desired from the OSP 198, and thus send or push the request to the REST API. In turn, the REST API talks in background to the service engine 183. Again, the service engine 183 determines the requested resource (which may be an estimate if the resource) and sends an aspect of it back to the REST API. In turn, the REST API sends the response that has the payload to the particular application (e.g., CCF 126).

As one example service the OSP 198 may provide to the client 193, the service engine 198 of the OSP may use digital rules to estimate resources for the client 193. However, the CCF 126 includes CSVDR 170A that may instead, or additionally, be used by the CCF 126 of the client computer system 190 to produce local estimates of the same resources, but with the advantage of not having to make network calls via network 188. These CSVDR 170A can be full versions of the digital rules used by the OSP 198 or less than full versions. For example, the CSVDR 170A of the CCF 126 may include local digital rules that can produce resource estimates in a less refined way than the online digital rules of the OSP 198. In many instances, the estimates produced by the OSP 198 using the digital rules of the OSP 198 may be more accurate than those produced locally by the CCF 126 of client computer system 190 using the CSVDR 170A. In some embodiments, but not always, the CSVDR 170A are a subset of the online digital rules of the OSP 198.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, any devices of the OPF 189 can be considered to be remote devices, from the perspective of the computer system 195 and/or client computer system 190.

In some instances, the user 192 or the client 193 may have instances of relationships with secondary entities. Only one such secondary entity 196 is shown. However, additional secondary entities may be present in various other embodiments. In this example, the client 193 has a relationship instance 197 with the secondary entity 196. In some embodiments, the secondary entity may also communicate with the client 193 via network 188.

In some instances, the user 192, the client 193 and/or one or more intermediary entities (not shown) may have data about one or more secondary entities, such as secondary entity 196, for example via relationship instances of the user 192 or client 193 with the secondary entity 196. The client 193 and/or the secondary entity 196 may be referred to as simply entities. One of these entities may have one or more attributes. Such an attribute of such an entity may be any one of its name, type of entity, a physical or geographical location such as an address, a contact information, an affiliation, a characterization of another entity, a characterization by another entity, an association or relationship with another entity (general or specific instances), an asset of the entity, a declaration by or on behalf of the entity, and so on.

Figure 2:
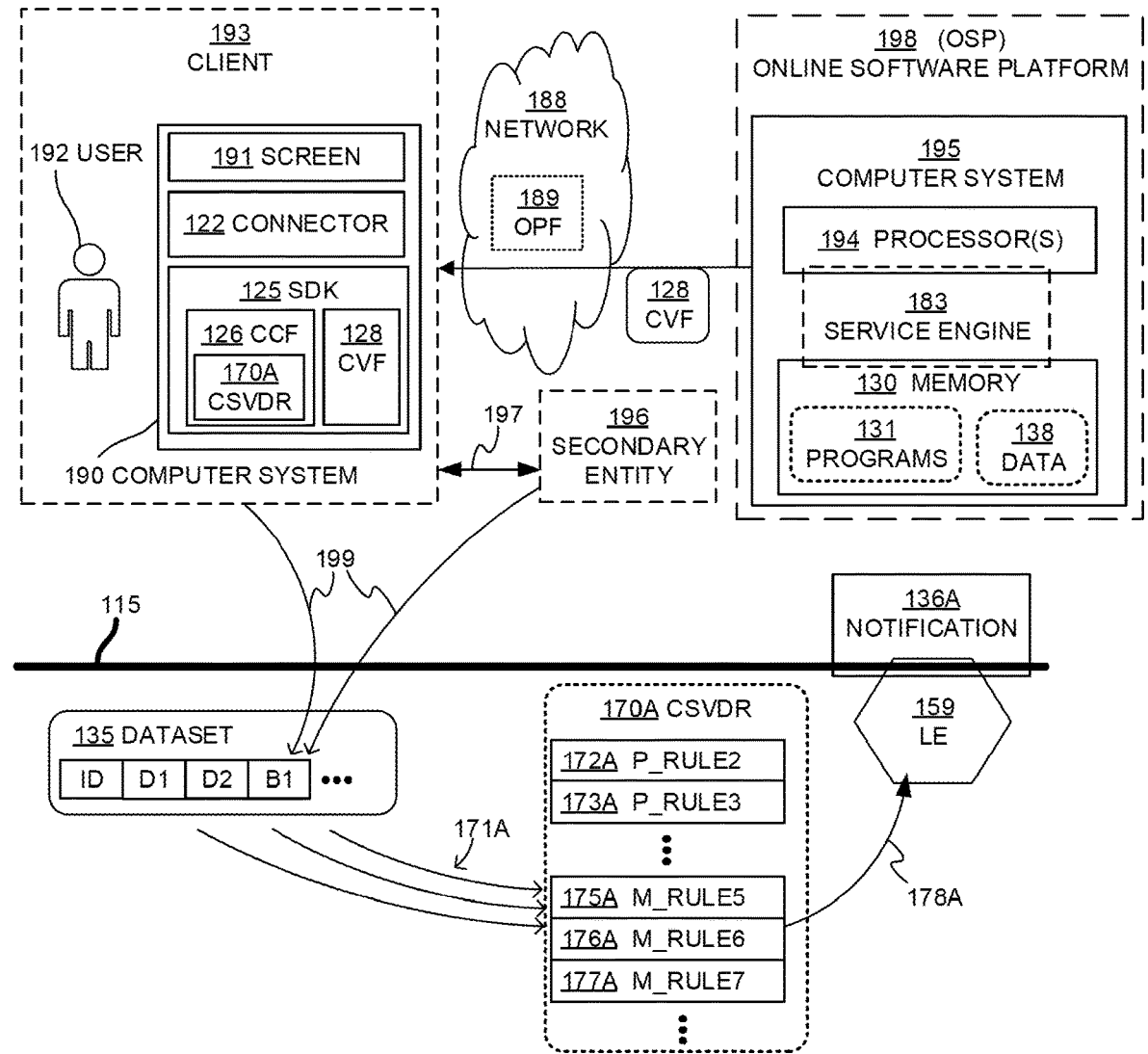
FIG. 2 is a diagram showing sample aspects of embodiments of the present disclosure involving producing and outputting a local estimate of a resource for a dataset by the CSVDR and values of a coarse values file (CVF) received by the client of FIG. 1, which is an improvement in automated computerized systems.

FIG. 2 is a diagram showing sample aspects of embodiments of the present disclosure involving producing and outputting a local estimate (LE) 159 of a resource for a dataset 135 by using the CSVDR 170A and values of a coarse values file (CVF) 128 received by the client 193 of FIG. 1, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly processing of data that takes place often within one or more of the components above the line 115.

Above the line 115, the sample computer system 195, network 188, client computer system 190 and secondary entity 196 according to embodiments is shown. In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the client 193 and/or the secondary entity 196. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

The CVF 128 has simple data for use by the CSVDR 170A in producing the local LE 159. The data of the CVF 128 might not be necessarily accurate, because it might not cover all the parameters that are needed by the CSVDR 170A to produce a more accurate estimate. For example, the CVF 128 can indicate rates according to particular domains, plus one or more special variables. Still, this may not be completely accurate in some instances as it would only provide approximate estimates because it does not discuss or consult other parameters that are needed to produce more accurate estimates. In embodiments, the CVF 128 is distributed via network 188 to special subscribers or clients of the OSP 198, which may include client 193. Subscribers, such as client 193, could be ecommerce platforms, high-volume direct customers of application programming interface (API) calls for accurate resource computation, accurate resource estimation, etc. In embodiments, the CVF 128 to be distributed is updated by the computer system 198 of the OSP 198 as new and updated content becomes digested. In various, embodiments, the CVF 128 may be transmitted from the OSP 198 via network 188 in response to a request form the client computer system 190, pushed periodically from the OSP 198 to the client computer system 190 and/or as new and updated content becomes digested by the OSP 198. The OSP 198 may distribute the CVF 128 in a number of ways, including, but not limited to, leveraging a function of the SDK 125 or calling a CVF subscription API of the service engine 183 directly.

In embodiments, stored CSVDR 170A may be included in the CCF 126 and accessed by the computer system 190. The CSVDR 170A are digital in that they are implemented for use by software. For example, the CSVDR 170A may be implemented within CCF 126. The CCF 126 may access the CSVDR 170A rules 170 and CVF 128 responsive to generating a dataset, such as the dataset 135. The CSVDR 170A may include main rules, which can thus be accessed by the computer system 190. In this example, three sample digital main rules are shown explicitly, namely M_RULES 175A, M_RULE6 176A, and M_RULE7 177A. In this example, the CSVDR 170A also include digital precedence rules P_RULE2 172A and P_RULE3 173A, which can thus be further accessed by the computer system 190. The CSVDR 170A may include additional rules and types of rules, as suggested by the vertical dot-dot-dots.

In embodiments, a certain one of the digital main rules may be identified from among the accessed stored CSVDR 170A by the computer system 190. In particular, values of the dataset 135 can be tested, according to arrows 171A, against logical conditions of the digital main rules. In this example, the certain main rule M_RULE6 176A is thus identified, which is indicated also by the beginning of an arrow 178A. Identifying may be performed in a number of ways, and depending on how the digital main rules are implemented.

A number of examples are possible for how to recognize that a certain condition of a certain digital rule is met by at least one of the values of the dataset 135. For instance, the certain condition could indicate a domain defined by boundary of a region that is within a space. In various embodiments, a domain may be a region defined by a boundary as discussed above or may be an entity representing or otherwise associated with the region. The region could be geometric, and be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the client 193, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on. In other instances, instead of rendering the characterized attribute in units comparable to those of the boundary, the CCF 126 may instead consult a more coarse value in the CVF 128, which maps an aspect of the address, such as zip code, to a parameter value associated with the zip code, such as rate to use in calculating the local estimate.

Where more than one of the digital main rules are found that could be applied, there are additional possibilities. For instance, the computer system 190 of FIG. 1 may further access at least one stored digital precedence rule, such as P_RULE2 172A or P_RULE3 173A. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied. However, when limited data is available or used, such as when the CCF 126 is using the CVF 128, the digital precedence rule may not be fully applied, such that only one of the digital main rules may be applied. Equivalent embodiments are also possible, where digital precedence rules are applied first to limit an iterative search, so as to test the applicability of fewer than all the rules according to arrows 171A.

In embodiments, an estimated resource may be produced for the dataset 135, by the computer system 190 locally applying the certain consequent of the certain digital main rule. The resource can be a computational result, a document, an item of value, a representation of an item of value, etc., made, created or prepared for the user 192, the client 193, the secondary entity 196, etc., on the basis of the attribute. As such, in some embodiments, the estimated resource is produced by a determination and/or a computation. In the example of FIG. 2, an estimated resource may be produced locally by the CCF 126 for the dataset 135, which is referred to as local estimate (LE) 159. This may be performed by the CCF 126 of computer system 190 locally applying the certain M_RULE6 176A, as indicated by the arrow 178A.

The local estimate may be produced in a number of ways. For example, the certain consequent can be applied to one of the values of the dataset 135 based on the CVF 128. For instance, one of the values of the dataset 135 can be a numerical base value, e.g. B1, that encodes an aspect of the dataset 135, as mentioned above. In such cases, applying a certain consequent of M_RULE6 176A may include performing a mathematical operation on the base value B1. For example, applying the certain consequent may include multiplying the base value B1 with a number found in the CVF 128 indicated by the certain consequent. Such a number can be, for example, a percentage, e.g., 1.5%, 3%, 5%, and so on. Such a number can be indicated directly by the certain rule, or be stored in a place indicated by the certain rule, such as in the CVF 128, and so on.

As mentioned above, in some embodiments two or more digital main rules may be applied. For instance, the computer system 195 may recognize that an additional condition of an additional one of the accessed CSVDR 170A is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the LE 159 may be produced by the CCF 126 of the computer system 190 applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the LE 159 may be produced by summing the first product and the second product, by averaging the first product and the second product, or by performing some other computation involving the first product and the second product. However, in some embodiments, when utilizing limited data, such as the CVF 128, the second number may not be available in the CVF 128, and thus the local estimate may be calculated instead based solely on the first number stored in the CVF 128, and thus produce a less accurate estimate than if the second number indicated by the additional consequent was also used.

In embodiments, a notification 136A can be caused to be presented on the screen 191, by the computer system 190. The notification 136A can include the LE 136A and/or be about an aspect of the LE 159. In the example of FIG. 2, a notification 136A can be caused to be transmitted by the computer system 195, for example as an answer or other response to the received dataset 135. The notification 136 can be about an aspect of the LE 159. In particular, the notification 136A may inform about the aspect of the LE 159, namely that it has been determined, where it can be found, what it is, or at least a portion or a statistic of its content, a rounded version of it, and so on. Of course, the planning should be that the recipient of the notification 136A understands what it is being provided.

The notification 136A can be transmitted to one of an output device and another device. The output device may be the screen of a local user, such as screen 191, or a remote user. The notification 136A may thus cause a desired image, message, or other such notification to appear on the screen, such as within a Graphical User Interface (GUI) and so on. The other device can be the remote device, from which the dataset 135 was received.

Figure 3:
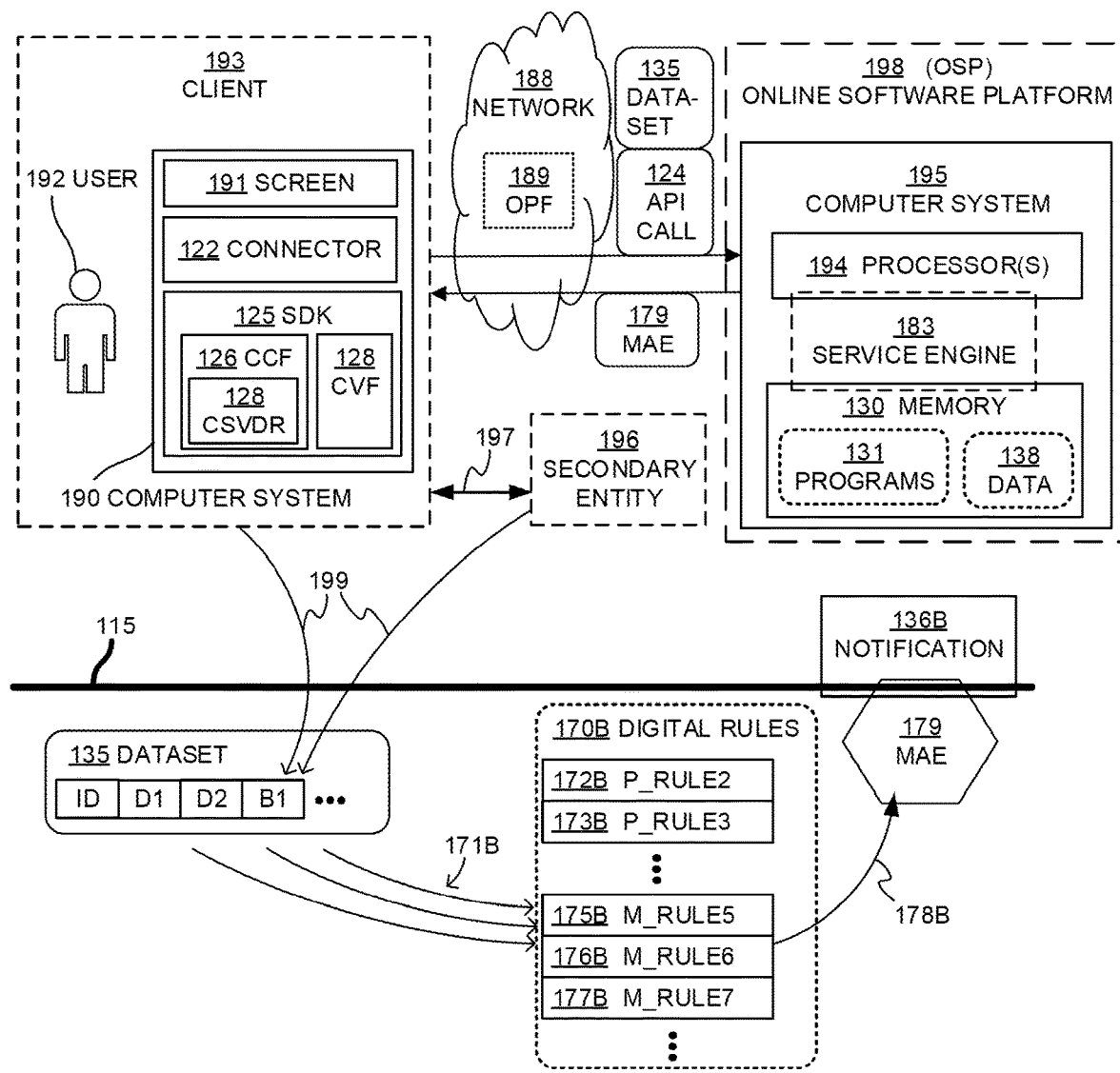
FIG. 3 is a diagram showing sample aspects of embodiments of the present disclosure involving producing, via one or more computer network calls to an online service platform (OSP) system, a more accurate estimate (MAE) of the resource that is more accurate than the local estimate of FIG. 2 based on the dataset and digital rules stored remotely at the OSP system that is an improvement in automated computerized systems.

FIG. 3 is a diagram showing sample aspects of embodiments of the present disclosure involving producing, via one or more computer network calls, such as application programming interface (API) call 124 to OSP 198, a more accurate estimate (MAE) 179 of the resource, which is an improvement in automated computerized systems. The MAE 179 is produced by the computer system 195 of the OSP 198 based on the dataset 135 communicated to the OSP 198 from the connector 122 of the client computer system 190 via network 188 and on digital rules 170B stored remotely at the OSP 198. The MAE 179 is more accurate than the LE 159 of FIG. 2 because, unlike the LE 159 that is produced based on the CVF 128, it is produced using data that covers all the parameters that are needed by all the digital rules 170B produce an accurate estimate of a resource based on the dataset 135.

The sample received dataset 135 is shown below the line 115. The dataset 135 may be received by the computer system 195 in a number of ways. In some embodiments, one or more requests may be received by the computer system 195 via a network. In this example, a request in the form of an API call 124 is received by the computer system 195 via the network 188. The API call 124 has been transmitted by the client computer system 190. The dataset 135 may be sent as part of or in conjunction with the API call 124, such as via connector 122. In some embodiments, the dataset 135 may be sent as part of or in conjunction with the API call 124. For example, the received API call 124 can carry one or more payloads. In such embodiments, the one or more payloads may be parsed by the computer system 195 to extract the dataset 135. In this example, the payload can be parsed by the computer system 195 to extract the dataset 135. In this example the single payload encodes the entire dataset 135, but that is not required. In fact, a dataset 135 can be received from the payloads of multiple requests or API calls. In such cases, a single payload may encode only a portion of the dataset. And, of course, the payload of a single request or API call may encode multiple datasets. Additional computers may be involved with the network 188, some beyond the control of the user 192 or OSP 198, and some within such control.

In embodiments, digital rules 170B may be stored at the OSP 198 and accessed by the computer system 195. These rules 170B are digital in that they are implemented for use by software. For example, these rules 170B may be implemented within programs 131 and data 138. Digital rules 170B may be accessed responsive to receiving a dataset, such as the dataset 135.

The digital rules 170 may include main rules, which can thus be accessed by the computer system 195. In this example, three sample digital main rules are shown explicitly, namely M_RULES 175B, M_RULE6 176B, and M_RULE7 177B. In this example, the digital rules 170 also include digital precedence rules P_RULE2 172B and P_RULE3 173B, which can thus be further accessed by the computer system 195. The digital rules 170 may include additional rules and types of rules, as suggested by the vertical dot-dot-dots. In some embodiments, the digital rules 170B may include more, or more complete, rules than the CSVDR 170A shown in FIG. 2. In such embodiments, the CSVDR 170A may be a subset of the digital rules 170B. This may be such that the CSVDR 170A comprise a smaller data package, and thus more efficiently deployable to the client computer system 190 via network 188. In other embodiments, the CSVDR 170A are the same as the digital rules 170B.

In embodiments, a certain one of the digital main rules may be identified from among the accessed stored rules by the computer system 195. In particular, values of the dataset 135 can be tested, according to arrows 171B, against logical conditions of the digital main rules, as described with reference to FIG. 2, but with the computer system 195 of the OSP 198 performing the test instead of the CCF 126 of the client computer system 190. In this example, the certain main rule M_RULE6 176B is thus identified, which is indicated also by the beginning of an arrow 178B similar to that that as described for main rule M_RULE6 176A in reference to FIG. 2. Identifying may be performed in a number of ways, and depending on how the digital main rules are implemented in a similar manner to that described with reference to the CSVDR 170A in FIG. 2.

In embodiments, a notification 136B can be caused to be transmitted, e.g., via the network 188, by the computer system 195. The notification 136B can be about or include an aspect of the resource, such as the MAE 179. In the example of FIG. 1, the notification 136B can be caused to be transmitted by the computer system 195, for example as an answer or other response to the API call 124 and/or received dataset 135. The notification 136B can be about an aspect of the MAE 179. In particular, the notification 136B may inform about the aspect of the MAE 179, namely that it has been determined, where it can be found, what it is, or at least a portion or a statistic of its content, a rounded version of it, and so on. Of course, the planning should be that the recipient of the notification 136B understands what it is being provided.

The notification 136B can be transmitted to one of an output device and another device. The output device may be the screen of a local user or a remote user. The notification 136 may thus cause a desired image, message, or other such notification to appear on the screen, such as within a Graphical User Interface (GUI) on screen 191 and so on. The other device can be the remote device, such as computer system 190, from which the API call 124 and/or dataset 135 was received.

In some embodiments, to save time and/or resources, under certain conditions the CCF 126 of the client computer system 190 may decide to produce the LE 159 shown in FIG. 2 instead of causing the MAE 179 to be produced via the API call 124. For example, the LE 159 may be able to be produced more efficiently or faster than the MAE 179 due to unfavorable conditions or latency of the network 188, overloading of the OSP 198 or other operating conditions or demands on the OSP 198 preventing the OSP 198 from producing the MAE 179 in a timely manner. Such conditions may be selectable by the user 192 as explained further below. Also, under certain conditions, the CCF 126 of the client computer system 190 may decide to produce the LE 159 shown in FIG. 2 and then cause the MAE 179 to be produced via a follow-up API call 124 (e.g., when operating conditions of the OSP 198 and/or network conditions are more favorable) for reconciliation with the MAE 179 to find discrepancies between the LE 159 and the MAE 179, as explained further below.

Figure 4:
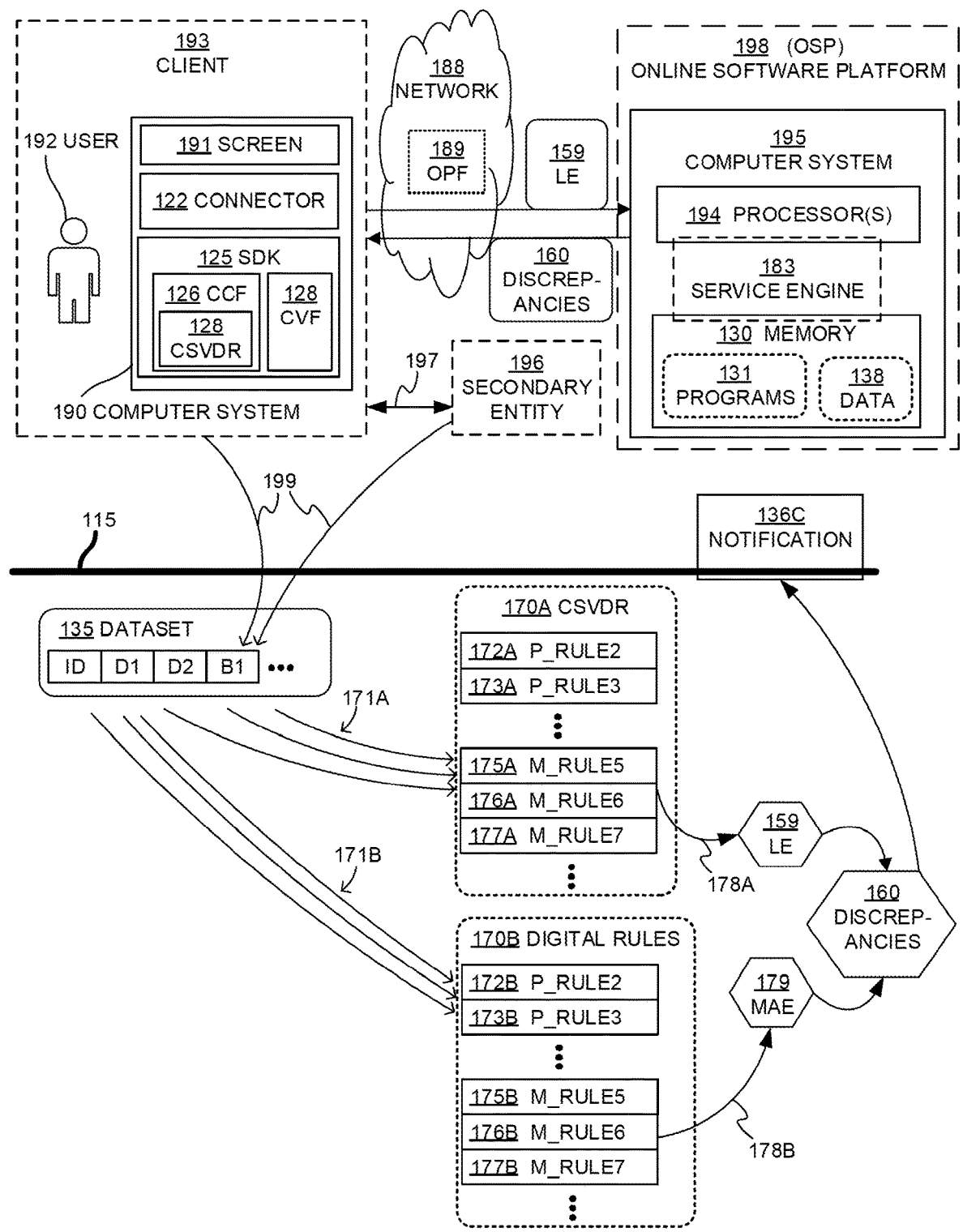
FIG. 4 is a diagram showing sample aspects of embodiments of the present disclosure involving the client of FIG. 3 transmitting the local estimate to the OSP for reconciliation with the more accurate estimate to find discrepancies between the local estimate and the more accurate estimate that is an improvement in automated computerized systems.

FIG. 4 is a diagram showing sample aspects of embodiments of the present disclosure involving the client 193 of FIG. 3 transmitting the LE 159 to the OSP 198 for reconciliation with the more MAE 179 to find discrepancies 160 between the LE 159 and the MAE 179 that is an improvement in automated computerized systems.

Under certain conditions, the CCF 126 of the client computer system 190 may decide to produce the LE 159 as described with reference to FIG. 2 and then cause the MAE 179 to be produced via a follow-up API call 124 as described with reference to FIG. 3 (e.g., when operating conditions of the OSP 198 and/or network conditions are more favorable) for reconciliation with the MAE 179 to find discrepancies 160 between the LE 159 and the MAE 179. In the present example, the LE 159 is transmitted to the OSP 198 via network 188 for reconciliation with the MAE 179 to find discrepancies 160 between the LE 159 and the MAE 179.

In particular, in response to the OSP 198 receiving the LE 159, the service engine 183 computes differences between the LE 159 and the MAE 179. For example, the LE 159 may have been produced by the CCF 126 of the client computer system 193 identifying and applying digital main rule M_RULE6 176A of the CSVDR 170A to the dataset 135 (according to arrows 171A and 178A) based on the CVF 128. Then, via a follow-up API call to the OSP 198 over network 188, such as the API call 124 of FIG. 3, the CCF 126 may cause the service engine 183 of the OSP 198 to produce the MAE 179 by identifying and applying an equivalent digital main rule M_RULE6 176B of the digital rules 170B to the dataset 135 (according to arrows 171B and 178B) based on a more accurate and/or complete set of parameters and data values than included the CVF 128. The service engine 183 may compute the differences between the LE 159 and the MAE 179, record these differences as discrepancies 160 and transmit, via network 188, a notification 136C to the client computer system 190 that has information about and/or includes the discrepancies. In the example, the notification 136C can be caused to be transmitted by the computer system 195, for example as an answer or other response to the receiving the LE 159. The notification 136C can include and/or be about an aspect of the discrepancies 160. In particular, the notification 136C may inform about the aspect of the discrepancies 160, namely that it they have been determined, where they can be found, what they are, or at least a portion or a statistic of their content, a rounded version of them, and so on. In some embodiments, the OSP 198 may electronically issue one or more resource refunds based on the discrepancies 160, such as the differences between the LE 159 and the MAE 179.

In some embodiments, the discrepancies 160 may also or instead be computed or otherwise determined by the CCF 126 of the client computer system 190. For example, the CCF 126 may compute the discrepancies 160 in response to receiving the notification 136B of FIG. 3 including the MAE 179 from the OSP 198. In such embodiments, the client computer system 190 may transmit the discrepancies 160 to the OSP 198 for verification and/or to receive a refund from the OSP 198 based on the discrepancies 160.

Figure 5:
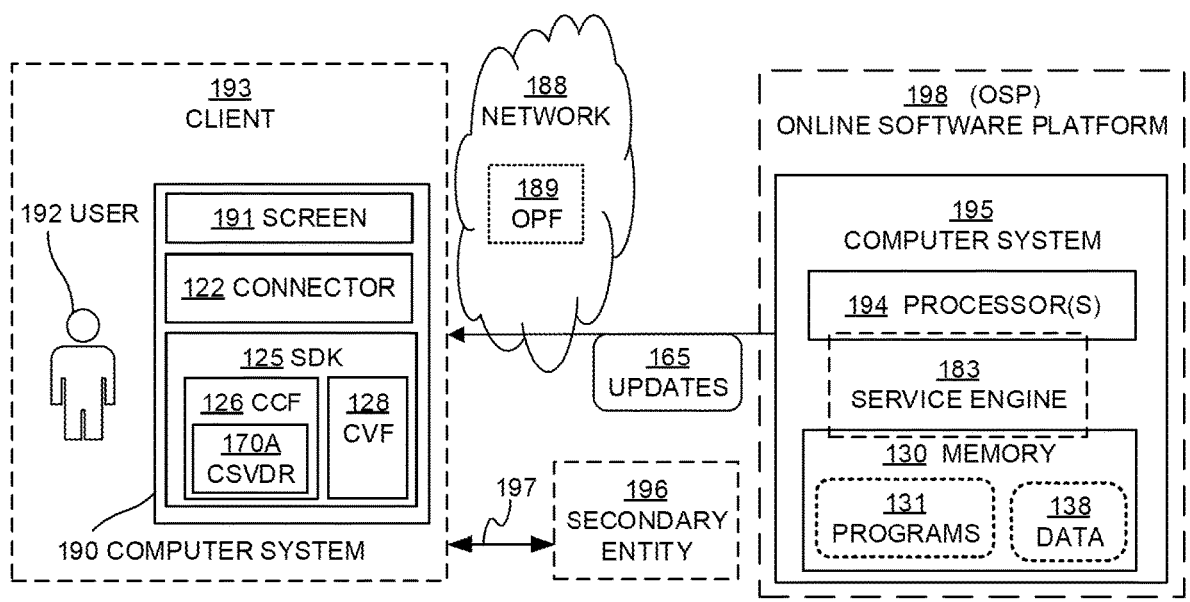
FIG. 5 is a diagram showing sample aspects of embodiments of the present disclosure involving the client of FIG. 2 receiving, from the OSP across the network, updates for producing the local estimate, which is an improvement in automated computerized systems.

FIG. 5 is a diagram showing sample aspects of embodiments of the present disclosure involving the client 193 of FIG. 2 receiving, from the OSP 198 across the network 188, updates 165 for producing the LE 159 shown in FIG. 2 and FIG. 4, which is an improvement in automated computerized systems.

It may be that the OSP 198 may obtain and/or generate updates 165 to rules and associated data that may affect how an estimate of a resource is to be computed. The OSP 198 may transmit such updates 165, such as in the form of an updated CVF and/or updated CSVDR, to the client computer system 190 via network 188 such that the CCF 126 of the client computer system 190 may produce the LE 159 based on this updated information.

For example, the connector 122 may receive updates 165 from the OSP 198 across the network 188, including an updated CVF that includes updated values. The CCF 126 may store locally on a storage medium of the computer system 190 the updated CVF to replace the CVF 128. The CCF 126 may produce by the CSVDR 170A and the updated values of the updated CVF, an additional LE of a resource for the dataset 135 shown FIG. 2 and FIG. 4 and output the additional local estimate to the screen 191 in conjunction with the dataset 135 similarly to how the LE 159 is produced using the original CVF 128 with reference to FIG. 2 and FIG. 4.

Figure 6:
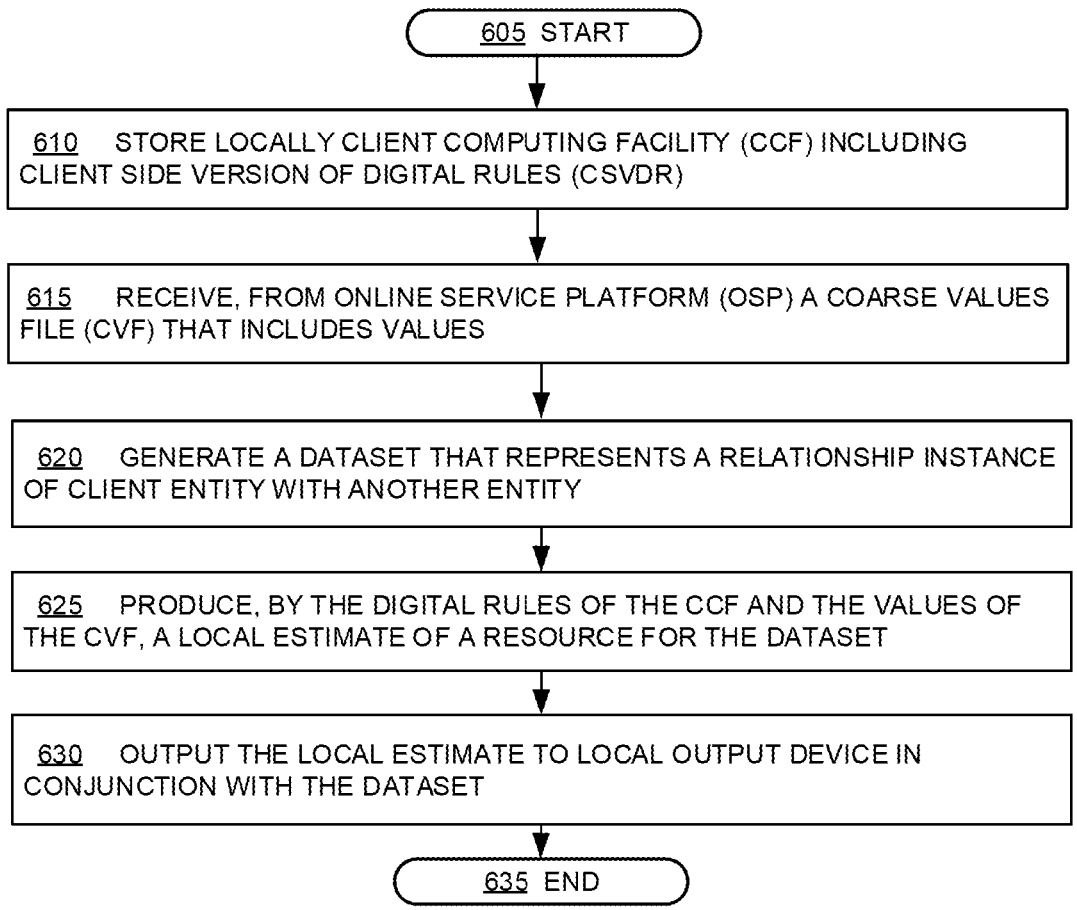
FIG. 6 is a flowchart for illustrating a sample method for producing a local estimate of a resource that is an improvement in automated computerized systems, according to embodiments of the present disclosure.

FIG. 6 is a flowchart for illustrating a sample method 600 for producing a local estimate of a resource that is an improvement in automated computerized systems, according to embodiments of the present disclosure.

Figure 7:
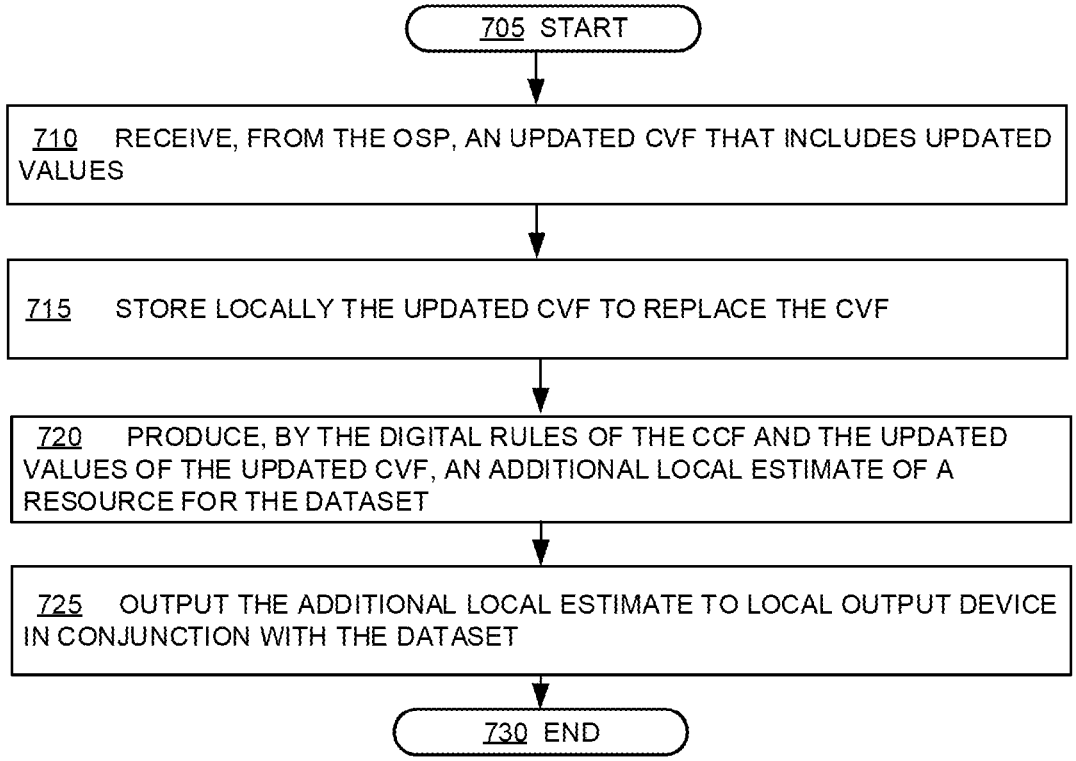
FIG. 7 is a flowchart illustrating a sample method for producing a local estimate of a resource based on an updated CVF that is an improvement in automated computerized systems, according to embodiments of the present disclosure.
Figure 8:
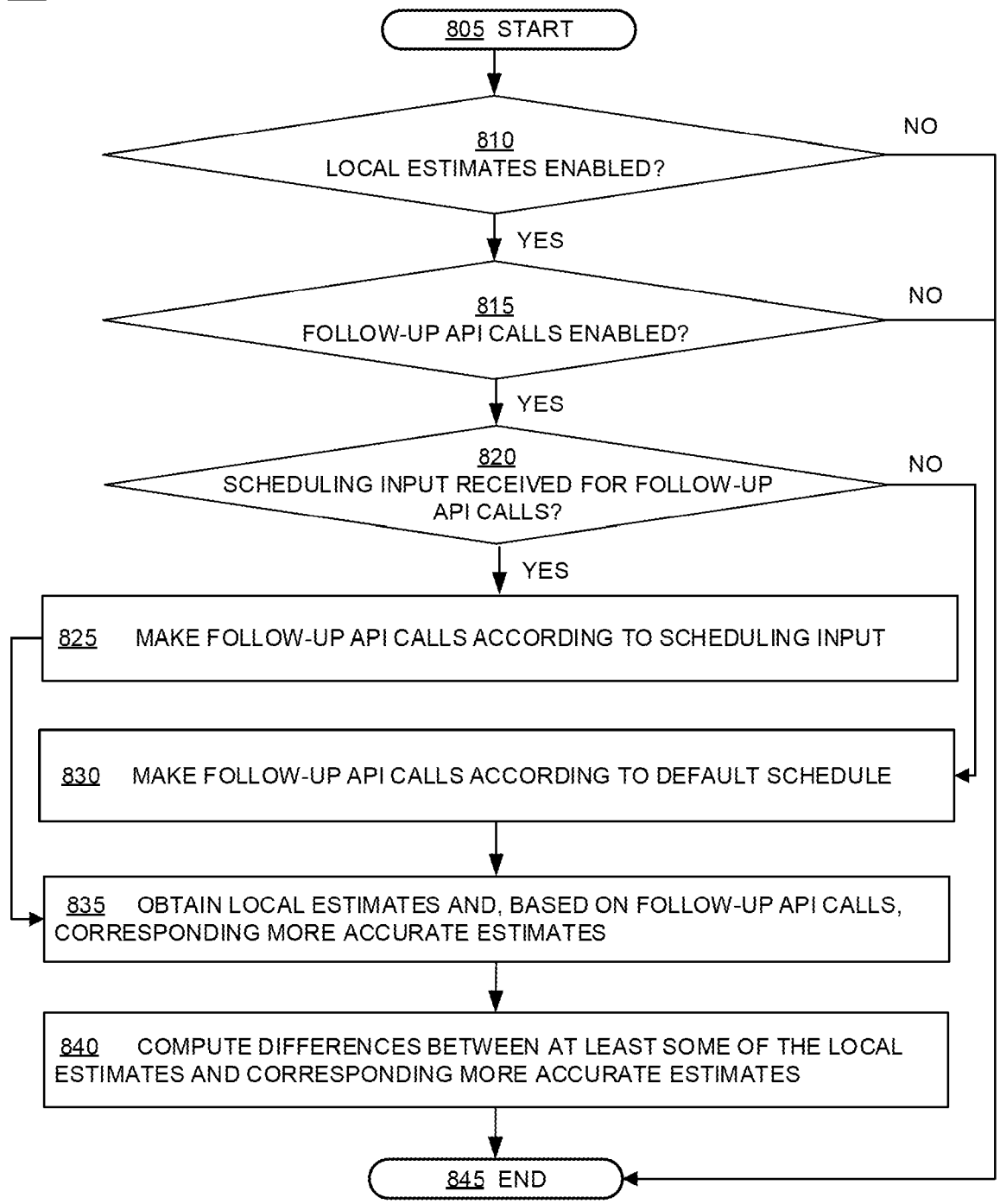
FIG. 8 is a flowchart illustrating a sample method for computing differences between local estimates and more accurate estimates that is an improvement in automated computerized systems, according to embodiments of the present disclosure.

Although, in the present example, the operations and methods described with reference to the flowcharts illustrated in FIGS. 6-8 are described as being performed by the client computer system 190, in various embodiments, one or more of the operations and methods described with reference to the flowcharts illustrated in FIGS. 6-8 may be performed by the computer system 195 of the OSP 198.

The method 600 starts at 605.

At 610, the computer system 190 stores locally on a storage medium a client computing facility (CCF) that includes digital rules.

At 615, the computer system 190 receives, from the OSP 198 across a network, a coarse values file (CVF) that includes values.

At 620, the computer system 190 generates a dataset that represents a relationship instance of a client entity of the computer system 190 with another entity.

At 625, the computer system 190 produces, by the digital rules of the CCF and the values of the CVF, a local estimate of a resource for the dataset.

At 630, the computer system 190 outputs the local estimate to a local output device of the computer system 190 in conjunction with the dataset.

The method 600 ends at 635.

In some embodiments, the computer system 190 may first determine whether producing the local estimate of the resource for the dataset has been enabled by the CCF. Producing of the local estimate is then performed if it is determined producing the local estimate of the resource for the dataset has been enabled. If it is determined producing the local estimate of the resource for the dataset has not been enabled, then, instead of producing the local estimate, the computer system 190 produces, via one or more computer network calls to the OSP 198, a more accurate estimate of the resource that is more accurate than the local estimate based on the dataset and digital rules stored remotely at the OSP 198. The computer system 190 receives the more accurate estimate from the OSP 198 and outputs the more accurate estimate to the local output device in conjunction with the dataset.

In some embodiments, the computer system 190 may present a selection of options via a graphical user interface (GUI). The options may include, for the dataset, one or more of: producing the local estimate and receiving the more accurate estimate. The computer system 190 receives a selection of the options. The production of the local estimate and the production of the more accurate estimate is then based on the selection.

In some embodiments, the computer system 190 may, after producing the local estimate, transmit a follow-up computer network call to the OSP 198 to produce a more accurate estimate of the resource that is more accurate than the local estimate based on the dataset and digital rules stored remotely at the OSP 198. In response to transmitting the follow-up computer network call to the OSP 198, the computer system 190 receives the more accurate estimate from the OSP 198.

FIG. 7 is a flowchart illustrating a sample method 700 for producing a local estimate of a resource based on an updated CVF that is an improvement in automated computerized systems, according to embodiments of the present disclosure.

In some embodiments, the computer system 190 may also receive, from the OSP 198 across the network, an updated CVF that includes updated values and store locally on the storage medium the updated CVF to replace the CVF. The computer system 190 may produce by the digital rules of the CCF and the updated values of the updated CVF, an additional local estimate of a resource for the dataset output the additional local estimate to the local output device in conjunction with the dataset.

In particular, the method 700 starts at 705.

At 710, the computer system 190 receives, from the OSP 198 across the network, an updated CVF that includes updated values.

At 715, the computer system 190 stores locally on a local storage medium the updated CVF to replace the CVF.

At 720, the computer system 190 produces, by the digital rules of the CCF and the updated values of the updated CVF, an additional local estimate of a resource for the dataset.

At 725, the computer system 190 outputs the additional local estimate to a local output device in conjunction with the dataset.

The method 700 ends at 730.

FIG. 8 is a flowchart illustrating a sample method 800 for computing differences between local estimates and more accurate estimates that is an improvement in automated computerized systems, according to embodiments of the present disclosure.

In particular, the method 800 starts at 805.

At 810, the computer system 190 determines whether local estimates are enabled. If it is determined local estimates are enabled, the method 800 proceeds to 815. If it is determined local estimates are not enabled, the method 800 ends at to 845.

At 815, the computer system 190 determines whether follow-up API calls (e.g., to the OSP 198) are enabled to produce more accurate estimates. If it is determined follow-up API calls are enabled, the method 800 proceeds to 820. If it is determined follow-up API calls are not enabled, the method 800 ends at to 845.

At 820, the computer system 190 determines whether scheduling input has been received for performing follow-up API calls (e.g., to the OSP 198) to produce more accurate estimates. For example, the computer system 190 may receive input indicating scheduling of a follow-up computer network call to the OSP 198. If it is determined scheduling input has been received for performing follow-up API calls, the method 800 proceeds to 825. If it is determined scheduling input has not been received for performing follow-up API calls, the method 800 proceeds to 830.

At 825, the computer system 190 makes follow-up API calls (e.g., to the OSP 198) to produce more accurate estimates. In particular, the computer system 190 will perform the follow-up computer network call to the OSP 198 according to the input indicating the scheduling. For example, the scheduling may indicate that a follow-up computer network call to the OSP 198 is to occur in response to, or at a time based on, internet response times exceeding one or more thresholds.

At 830, the computer system 190 makes follow-up API calls (e.g., to the OSP 198) according to a default schedule in cases where it is determined scheduling input has not been received for performing follow-up API calls.

At 835, the computer system 190 obtains local estimates of resources and then, based on the follow-up API calls, obtains corresponding more accurate estimates from the OSP 198.

At 840, the computer system 190 computes differences between at least some of the local estimates produced by the computer system 190 and corresponding more accurate estimates received from the OSP 198. For example, the computer system 190 may reconcile the local estimates with the more accurate estimates to find discrepancies between the local estimate and the more accurate estimates.

The method 800 ends at 845.

OPERATIONAL EXAMPLES—USE CASES

The above-mentioned embodiments have one or more uses. Aspects presented below may be implemented as was described above for similar aspects. (Some, but not all, of these aspects have even similar reference numerals.)

Referring again to FIGS. 1-5, as an example use case, businesses, such as client 193, may use the OSP 198 to estimate a resource (e.g., a sales tax, service tax, use tax, electronic waste recycling (eWaste) fees, etc.) on transactions with customers, such as with secondary entity 196. Such estimations may be made and transmitted before, during and/or after these transactions. Such taxes involving transactions may be referred to herein generally as transaction taxes. Such transactions with customers are examples relationship instances with secondary entities, such as secondary entity 196, described above. The businesses may transmit information to the OSP 198 over network 188 via connector 122 in order to enable the OSP 198 to produce and transmit the tax estimates back to the businesses. This information may include, but is not limited to: data regarding the seller and recipient of the goods or services involved in the transaction; the respective locations of the seller, the recipient, and the goods and/or services; locations where the goods are delivered or where the recipient takes possession of the goods or receives the services; data about the goods and/or services being sold; and other transaction data. This data may be included in a dataset, such as dataset 135 shown in FIG. 2.

However, due to unfavorable conditions or latency of the network 188, overloading of the OSP 198 or other operating conditions or demands on the OSP 198 preventing the OSP 198 from producing the estimates in a timely manner, a rough, locally generated tax estimate (e.g., LE 159) based on a coarse values file (e.g., CVF 128) that was previously received from the OSP 198 may be able to be produced and received by the client computing system 190 more efficiently or faster than the more accurate tax estimate (e.g., MAE 179). This may be important especially when ales tax estimates are needed in real time as transaction are occurring. For example, CVF 128 may have tax rates according to zip codes, plus one or more special variables. Still, it may be that this information is not complete or fully accurate, and thus would only provide approximate estimates because it does not discuss or consult other tax-related parameters, such as, for example, individual product taxability (e.g. clothing, alcohol, etc.), tax holidays and, in any event, tax boundaries which do not necessarily follow the zip codes that the CVF 128 is based on. Also, although the CVF 128 may not include all the parameters and values needed to provide a fully accurate tax estimate, reducing the data package size of the CVF 128 makes it more efficiently and easily deployable to the client computer system 190 via network 188.

Figure 9:
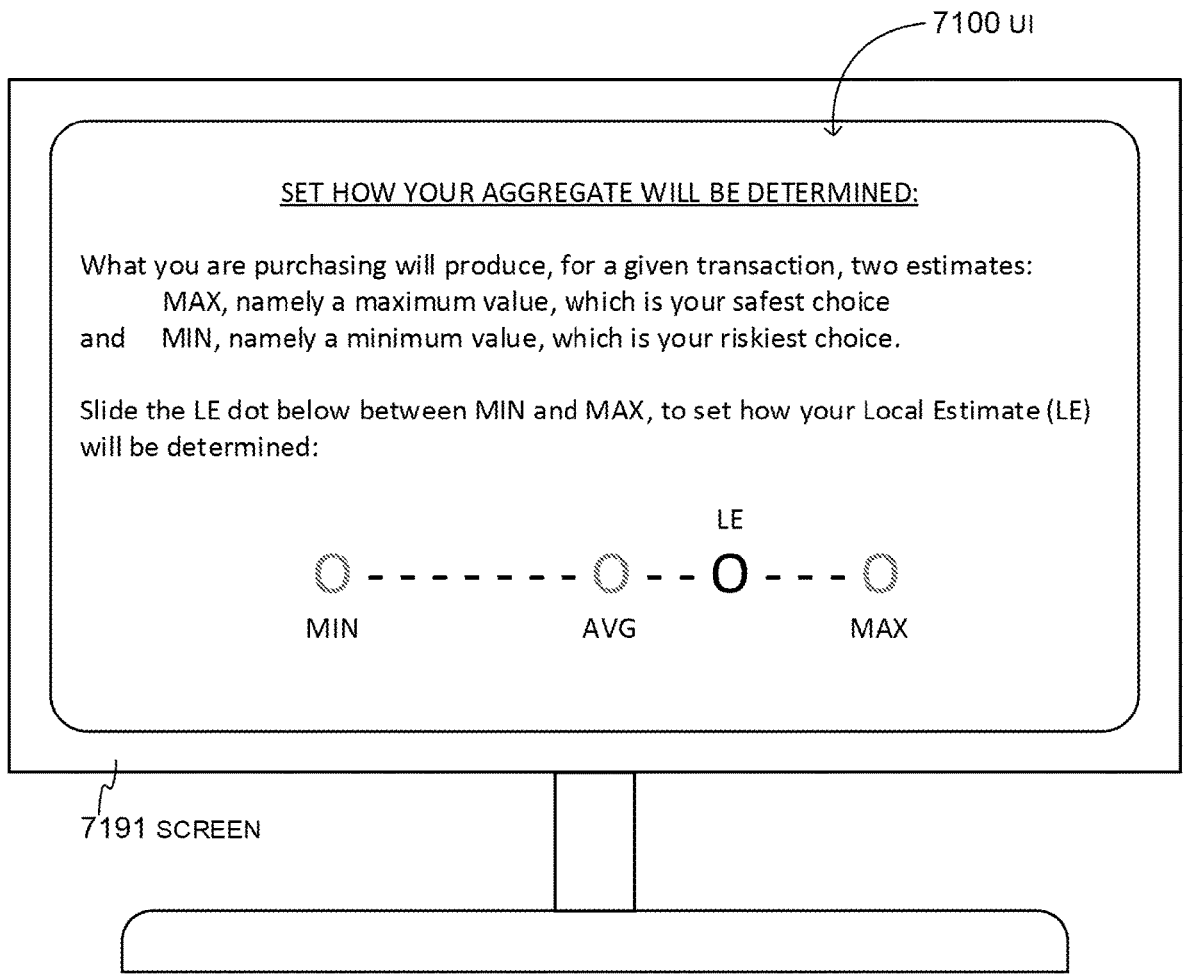
FIG. 9 is a sample view of a User Interface (UI) of a system for estimating less-than-critical resources that provides a selectable option to produce a local estimate of a resource based on a selection of a degree of risk between a lower risk local estimate and a higher risk local estimate that is an improvement in automated computerized systems, according to embodiments of the present disclosure.

FIG. 9 is a sample view of a User Interface (UI) 7100 of a system for estimating less-than-critical resources that provides a selectable option to produce a local estimate of a resource based on a selection of a degree of risk between a lower risk local estimate and a higher risk local estimate that is an improvement in automated computerized systems, according to embodiments of the present disclosure.

There may be different outcomes (i.e., different tax estimates) based on possible values of the information missing in the CVF 128 or rules absent from the CSVDR 170A. One of the estimates may be associated with a higher risk to the client 193, such as resulting in an estimation of no tax due when it is actually due, or a tax estimated that is too low. This may result in the business having to pay the tax that should have been collected or being otherwise legally penalized. One of the estimates may be associated with a lower risk to the client 193, such as small risk of legal ramifications and liability as compared to the higher risk option.

For example, the UI 7100 may be presented by the CCF 126 of the computer system 190 and the screen 7191 on which the UI 7100 is presented may be the screen 191 of the computer system 190. The selectable option may be to produce the LE 159 of FIG. 2 of a tax based on a selection of a degree of risk between a lower risk local estimate and a higher risk local estimate. The computer system 190 may receive input indicating a selection of the degree of risk between the lower risk local estimate and the higher risk local estimate. The production of the LE 159 may then include producing, by the CSVDR 170A and the values of the CVF 128, the local tax estimate based on the selection of the degree of risk between the lower risk local tax estimate and the higher risk local tax estimate. For example, the CCF 126 may calculate a weighted average between the lower risk local estimate and the higher risk local estimate based on the degree of risk between the lower risk local estimate and the higher risk local estimate selected by the user 192. In other embodiments, the CCF 126 may select an estimate between the lower risk local estimate and the higher risk local estimate proportional to the degree of risk between the lower risk local estimate and the higher risk local estimate selected by the user 192.

In the present example, the user 192 may the degree of risk between the lower risk local estimate and the higher risk local estimate by sliding a graphical use interface element on UI 7100 to a location on a scale between a graphical element representing the lower risk local estimate and a graphical element representing the higher risk local estimate. However, in various other embodiments, the degree of risk between the lower risk local estimate and the higher risk local estimate may be selected via other input elements such as buttons, dials, input fields, menu items, etc.

Figure 10:
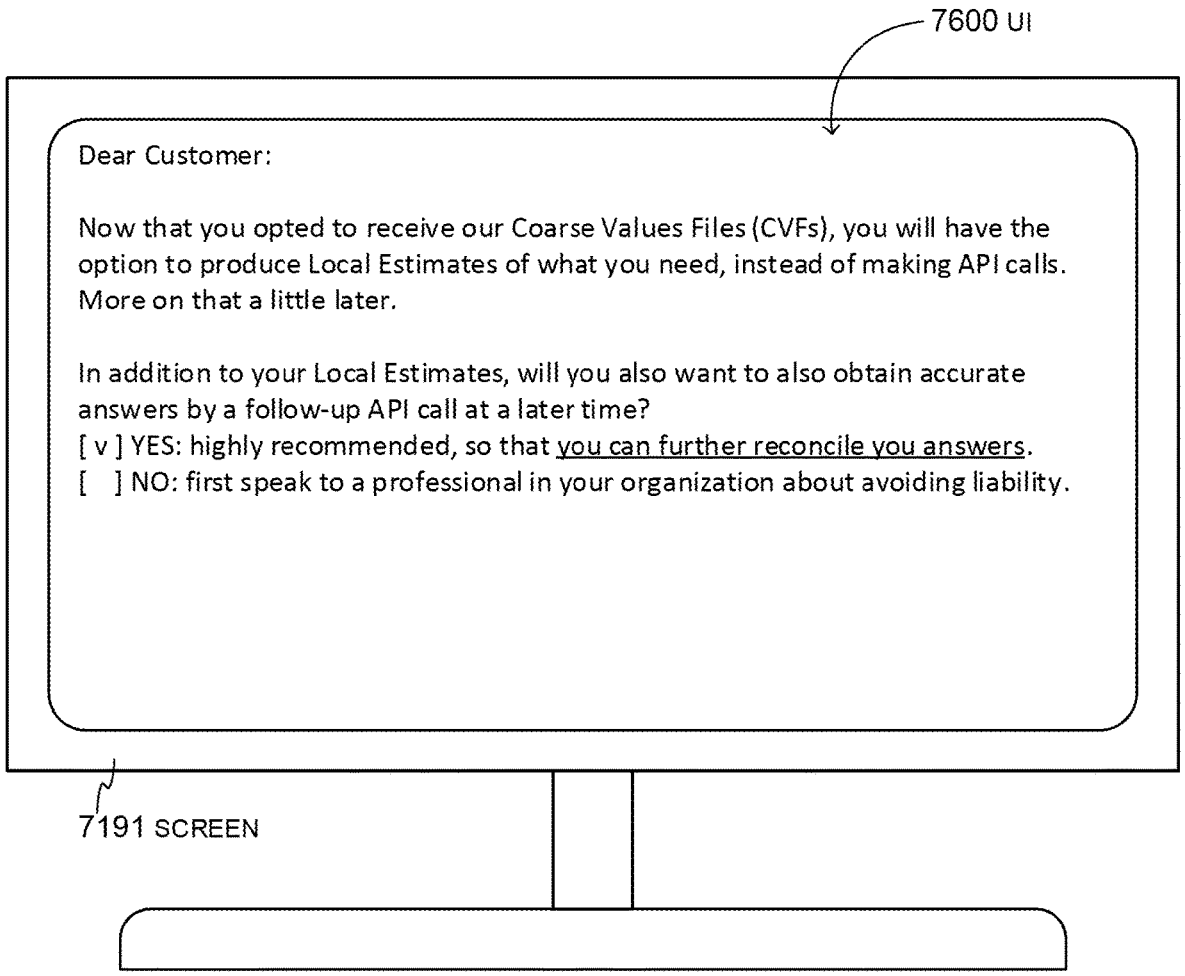
FIG. 10 is a sample view of a UI of a system for estimating less-than-critical resources that provides a selectable option to receive both local estimates and more accurate estimates via follow-up computer network calls to an OSP system that is an improvement in automated computerized systems, according to embodiments of the present disclosure.

FIG. 10 is a sample view of a UI 7600 of a system for estimating less-than-critical resources that provides a selectable option to receive both the LE 159 and MAE 179 via follow-up computer network calls, such as API call 124, to the OSP 198, which is an improvement in automated computerized systems, according to embodiments of the present disclosure.

The UI 7600 may be presented by the CCF 126 of the computer system 190 and the screen 7191 on which the UI 7600 is presented may be the screen 191 of the computer system 190. For example, the UI 7600 may be presented after the client 193 has opted to receive the CVF 128 to produce the LE 159. Shown on UI 7600 is a selectable option to receive both the LE 159 and MAE 179 via follow-up API call 124 to OSP 198 at a later time, as described above with respect to FIGS. 3 and 4. In UI 7600, it is highly recommended that the client 193 select to receive both the LE 159 and MAE 179 via follow-up API call 124 to OSP 198, so that the client 193 can further reconcile the local estimate produced.

Figure 11:
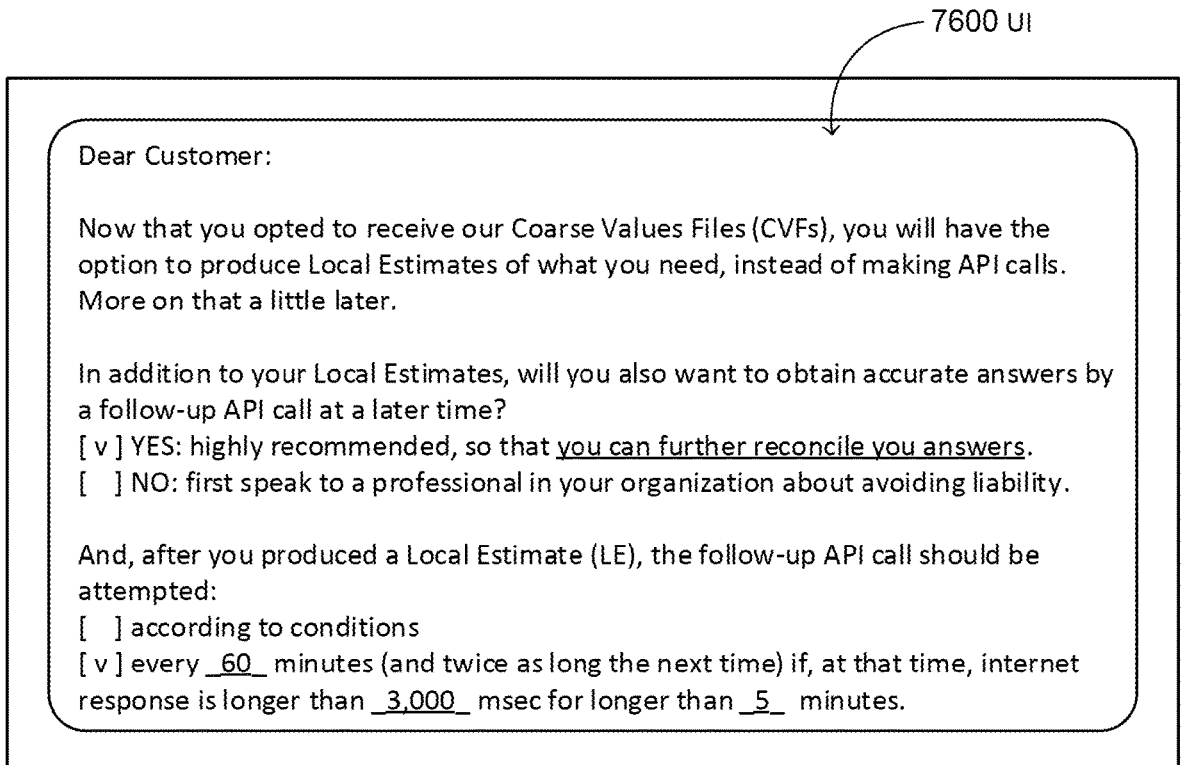
FIG. 11 is another sample view of the UI of FIG. 10 providing a selectable option to indicate when the follow-up computer network calls to the OSP system should be attempted that is an improvement in automated computerized systems, according to embodiments of the present disclosure.

FIG. 11 is another sample view of the UI 7600 of FIG. 10 providing a selectable option to indicate when follow-up computer network calls, such as API call 124, to the OSP 198 should be attempted, which is an improvement in automated computerized systems, according to embodiments of the present disclosure.

The UI 7600 may be presented by the CCF 126 of the computer system 190 and the screen 7191 on which the UI 7600 is presented may be the screen 191 of the computer system 190. For example, the UI 7600 may be presented after the client 193 has opted to receive the CVF 128 to produce the LE 159. The UI 7600 indicates to the client 193 that opted to receive the CVF 128 that they will now have the option to produce LE 159 instead of making API calls. However, in addition to producing the LE 159 for the client 193, the UI 7600 provides the option for the client 193 to obtain the MAE 179 by a follow-up API call, such as API call 124, at a later time. Also, the UI 7600 provides the option for the client 193 to select under what conditions the follow-up API call will be attempted in order to obtain the MAE 179. For example, the client 193 may select to have the follow-up API call attempted at a selectable particular frequency (e.g., every 60 minutes) after the internet response time is over a selectable threshold (e.g., 3000 msec) for longer than a selectable amount of time (e.g., 5 minutes). Other selectable conditions for attempting the follow-up API calls may be selected and set in various other embodiments via UI 7600.

Figure 12:
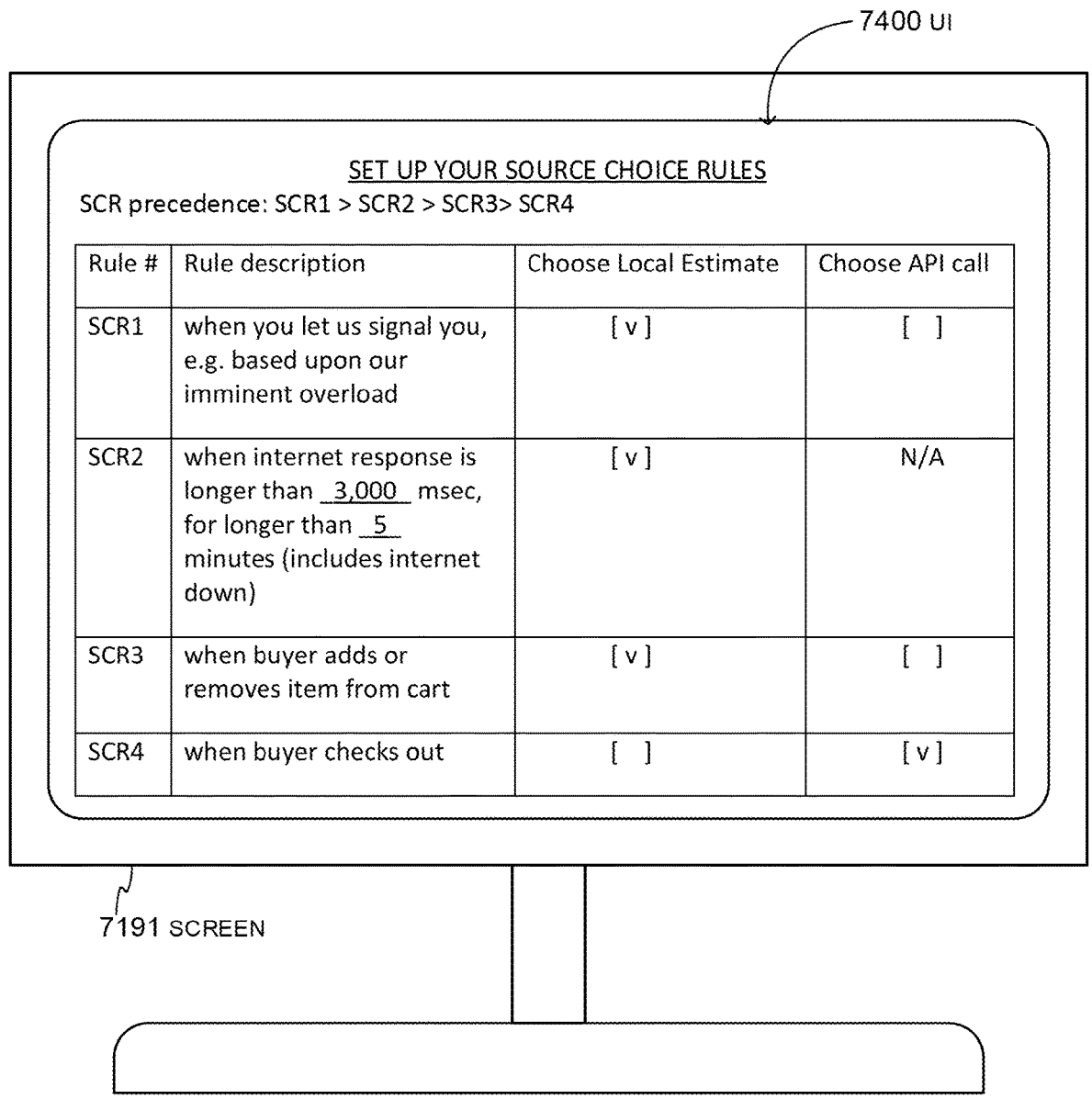
FIG. 12 is another sample view of a UI of a system for estimating less-than-critical resources that provides selectable options to indicate under what conditions particular sources of resource estimate production are to be automatically used, which is an improvement in automated computerized systems, according to embodiments of the present disclosure.

FIG. 12 is another sample view of a UI 7400 of a system for estimating less-than-critical resources that provides selectable options to indicate under what conditions particular sources of resource estimate production are to be automatically used, which is an improvement in automated computerized systems, according to embodiments of the present disclosure.

The UI 4600 may be presented by the CCF 126 of the computer system 190 and the screen 7191 on which the UI 7400 is presented may be the screen 191 of the computer system 190. For example, the client 193 may select to produce local sales tax estimates versus the more accurate sales tax estimates via an API call to the OSP 198 over the network according to various source choice rules (SCR), which are selectably ordered by precedence.

For example, as first precedence, according to selectable SCR1, the client 193 may select to produce local sales tax estimates when signaled by the OSP 198. In such an embodiment, the computer system 190 may receive a signal from the OSP 198. The signal may set a flag value to indicate whether producing a more accurate sales tax estimate via one or more computer network calls to the OSP 198 is allowed. In some embodiments, the signal from the OSP 198 is a warning of a potential service interruption of the OSP system and, in response to the signal, the flag value is set to indicate that producing the more accurate estimate via one or more computer network calls to the OSP 198 is not allowed. The flag value may indicate producing the more accurate sales tax estimate via one or more computer network calls to the OSP 198 is allowed when network and operating conditions of the OSP 198 are not overloaded. On the other hand, the flag value may be set by the OSP 198 to indicate that producing a more accurate sales tax estimate via one or more computer network calls to the OSP 198 is not allowed in response to network and operating conditions of the OSP 198 indicating an imminent overload of the network and/or OSP 198.

The computer system 190 will then produce, via one or more computer network calls to the OSP 198, the more sales tax accurate estimate if particular selectable conditions in which to produce the more accurate estimate are met (such as according to the other selectable SCR in UI 7400) and the flag value indicates that producing the more accurate estimate via one or more computer network calls to the OSP system is allowed. The computer system 190 will produce the local estimate instead of the more accurate estimate if the flag value indicates that producing the more accurate estimate via one or more computer network calls to the OSP system is not allowed. Also, the computer system 190 may receive an all clear signal from the OSP 198 clearing the warning of the potential service interruption. In response to receiving the all clear signal, the computer system 190 may change the flag value to indicate that producing the more accurate estimate via one or more computer network calls to the OSP 198 is allowed again.

As second precedence, according to selectable SCR2, the computer system 190 will produce the local estimate of sales tax instead of the more accurate sales tax estimate when internet response is longer than 3,000 msec, for longer than 5 minutes (includes internet down).

As third precedence, according to selectable SRC3, the computer system 190 will produce the local estimate of sales tax instead of the more accurate sales tax estimate when a buyer adds or removes item from the cart at the online store provided by the client 193.

As fourth precedence, according to selectable SRC4, the computer system 190 will produce the more accurate sales tax estimate instead of the local estimate of sales tax when a buyer when buyer checks out with their cart at the online store provided by the client 193 (e.g., due to the higher risk of charging the buyer incorrectly for sales tax rather than merely providing an estimate of sales tax before the buyer pays).

In various embodiments, the selectable SCR may implement a fall back mode where the local estimate function of the CCF 126 is selected to be used only if the OSP 198 is unable to be reached within a user specified amount of time, such as from an e-commerce application attempting to make a transaction.

Figure 13:
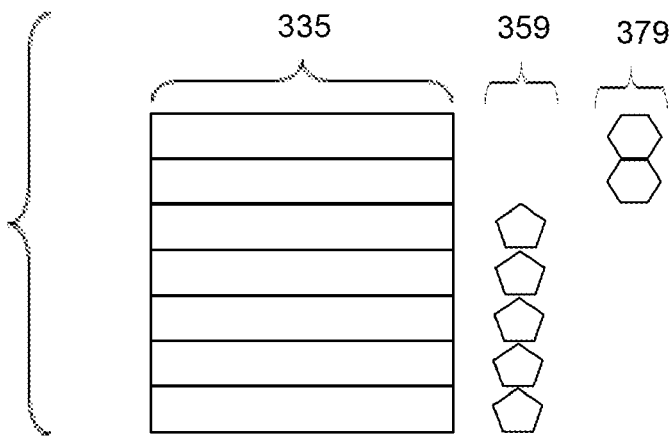
FIG. 13 is a diagram showing a representation of an example dataset in a system for estimating less-than-critical resources and indicating for which relationship instances of the dataset a local estimate was produced and also indicating for which relationship instances of the dataset a more accurate estimate was produced, which is an improvement in automated computerized systems, according to embodiments of the present disclosure.

FIG. 13 is a diagram showing a representation of an example dataset in a system for estimating less-than-critical resources and indicating for which relationship instances of the dataset a local estimate was produced and also indicating for which relationship instances of the dataset a more accurate estimate was produced, which is an improvement in automated computerized systems, according to embodiments of the present disclosure.

For example, the dataset 335 may be an example of dataset 135 of FIG. 3 and include data representing a set of sales transactions of client 193 with secondary entity 196. In the present example, more accurate sales tax estimates 379 are received for the first two transactions via a timely API call, such as API call 124 of FIG. 3. For the remaining five transactions, the client computer system 190 instead produces timely less accurate local estimates 359 of sales tax. For example, for the first two transactions, conditions were met according to the selected SCR of FIG. 12 for producing accurate sales tax estimates via a timely API call. However, for the remaining five transactions, conditions were not met according to the selected SCR of FIG. 12 for producing accurate sales tax estimates via a timely API call, so the client computer system 190 instead produced timely less accurate local estimates 359 of sales tax for those remaining five transactions.

Figure 14:
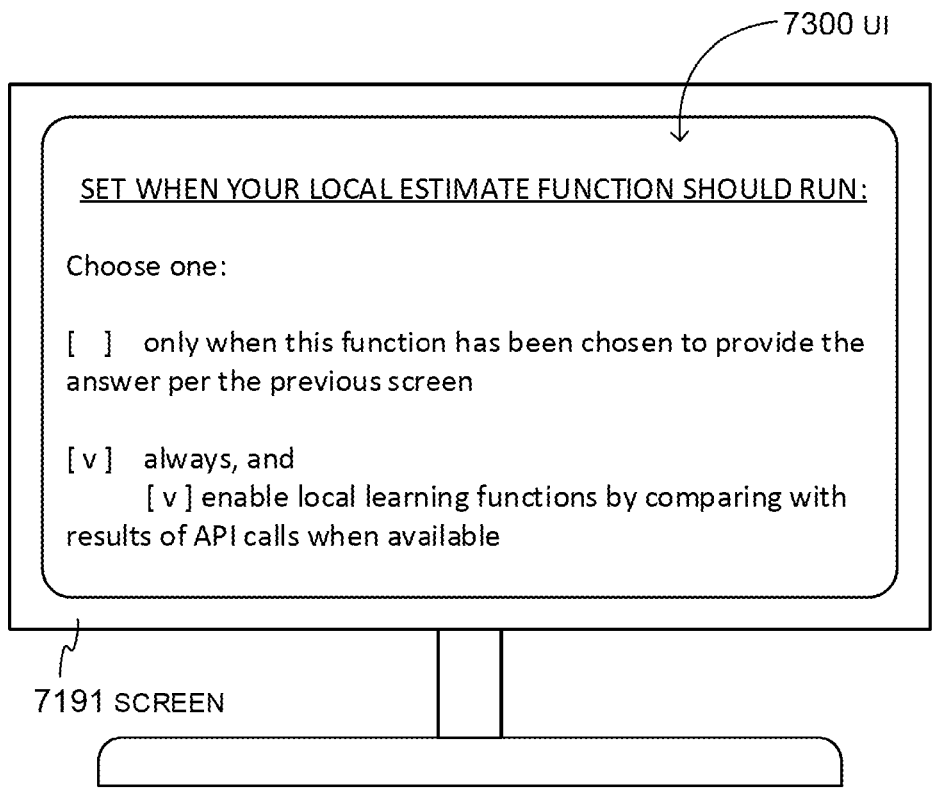
FIG. 14 is another sample view of a UI of a system for estimating less-than-critical resources that provides a selectable option to indicate whether a local estimate of resources is always to be produced and whether to enable local learning functions of the system that compares the local estimate with results of more accurate estimates via API calls when available, which is an improvement in automated computerized systems, according to embodiments of the present disclosure.

FIG. 14 is another sample view of a UI 7300 of a system for estimating less-than-critical resources that provides a selectable option to indicate whether a local estimate of resources is always to be produced and whether to enable local learning functions of the system that compares the local estimate with results of more accurate estimates via API calls when available, which is an improvement in automated computerized systems, according to embodiments of the present disclosure. In some embodiments, the UI 7300 is generated and presented after or in response to the user making a selection in the UI 7400 of FIG. 12.

In some embodiments, using the discrepancies 160 computed in reference to FIG. 4 based on differences between the LE 159 and MAE 179, the client computer system 190 and/or computing system 195 may learn to improve certain values in the CVF 128 and/or CSVDR 170A based on historical discrepancies involving the use of certain values or parameters in the CVF 128 and/or digital rules in the CSVDR 170A. In various embodiments, various machine learning and/or various artificial intelligence (AI) models may be used to train the system and perform the learning aspects. Thus, the client 193 may select, as shown in UI 7300, to always have the local estimate produced, even when the more accurate estimate is produced first, in order to enable this learning functionality and improve the accuracy of the local estimates. Alternatively, the client 198 may select, via UI 7300, for the computer system 190 to only produce the local estimate according to the selections made within the UI 7400 of FIG. 12, which may have been displayed on the screen previous to the UI 7300.

Figure 15:
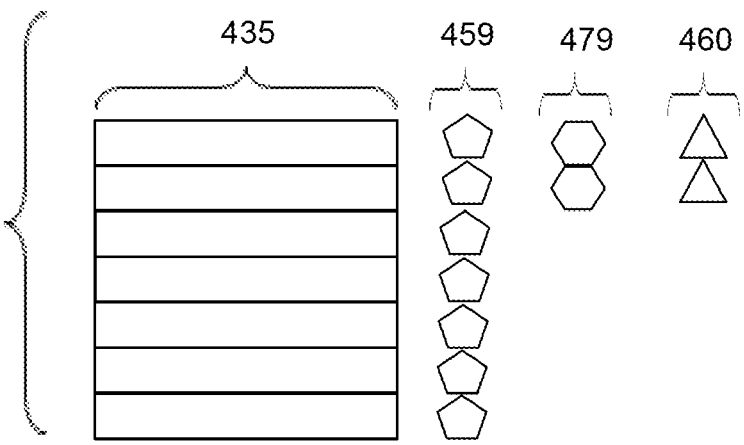
FIG. 15 is a diagram showing a representation of an example dataset in a system for estimating less-than-critical resources and discrepancies between local estimates and more accurate estimates that were produced for relationship instances of the dataset, which is an improvement in automated computerized systems, according to embodiments of the present disclosure.

FIG. 15 is a diagram showing a representation of an example dataset in a system for estimating less-than-critical resources and discrepancies between local estimates and more accurate estimates that were produced for relationship instances of the dataset, which is an improvement in automated computerized systems, according to embodiments of the present disclosure.

For example, the dataset 435 may be an example of dataset 135 of FIG. 3 and include data representing a set of sales transactions of client 193 with one or more customers, such as secondary entity 196. In the present example, more accurate sales tax estimates 479 are received for the first two transactions via a timely API call, such as API call 124 of FIG. 3. Also, for all the transactions, the client computer system 190 instead produces less accurate local estimates 459 of sales tax, such as according to a selection made in UI 7300 to always have the local estimate produced, even when the more accurate estimate is produced first, in order to enable the learning functionality and improve the accuracy of the local estimates based on discrepancies 460 between the local estimates 459 of sales tax and the more accurate sales tax estimates 479.

Figure 16:
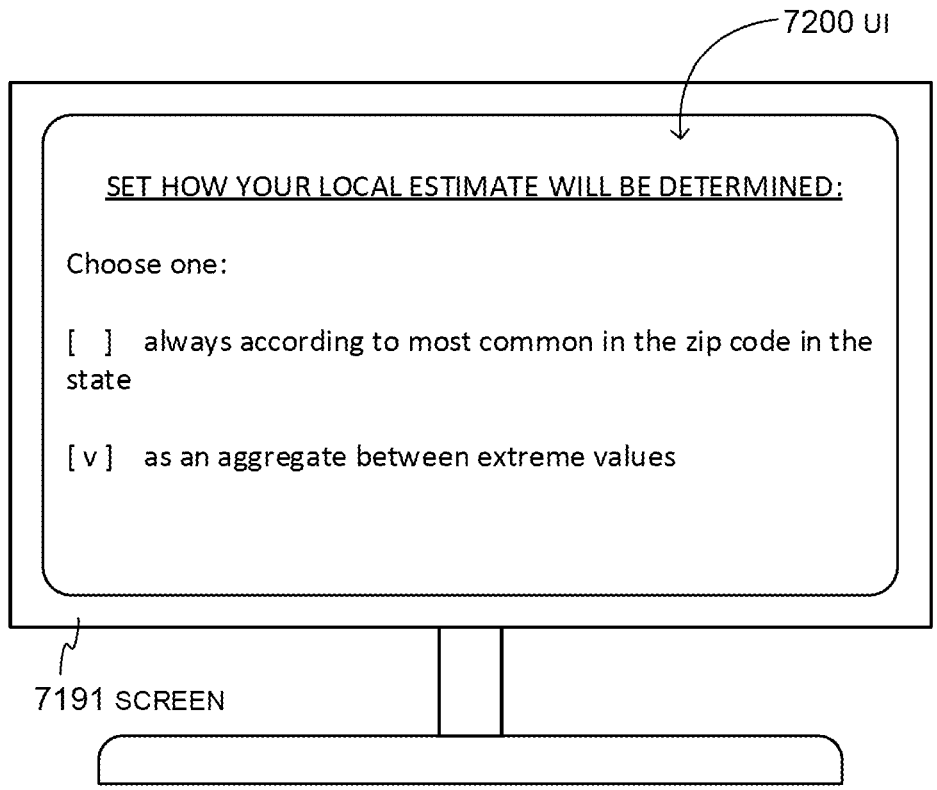
FIG. 16 is another sample view of a UI of a system for estimating les s-than-critical resources that provides a selectable option to indicate how local estimates will be determined by the system, which is an improvement in automated computerized systems, according to embodiments of the present disclosure.

FIG. 16 is another sample view of a UI 7200 of a system for estimating less-than-critical resources that provides a selectable option to indicate how local estimates will be determined by the system, which is an improvement in automated computerized systems, according to embodiments of the present disclosure.

The UI 7200 may be presented by the CCF 126 of the computer system 190 and the screen 7191 on which the UI 7200 is presented may be the screen 191 of the computer system 190. For example, sales tax may vary based on zip code and particular locations within a zip code, but in order to produce a rough local estimate of sales tax in a timely manner without having to make network calls to the OSP 198 for a more accurate sales tax estimate, the client 193 may select to have the client computer system 190 determine the local estimate of sales tax using the values of the CVF 128 either (i) always according to the most common zip code in the state, or (ii) as an aggregate between extreme values. In some embodiments, the extreme values may be a location having the lowest sales tax in the state and a location having the highest sales tax in the state, and the aggregate may be an average between those two values or some other aggregate value between, or otherwise based on, those extreme values.

Figure 17:
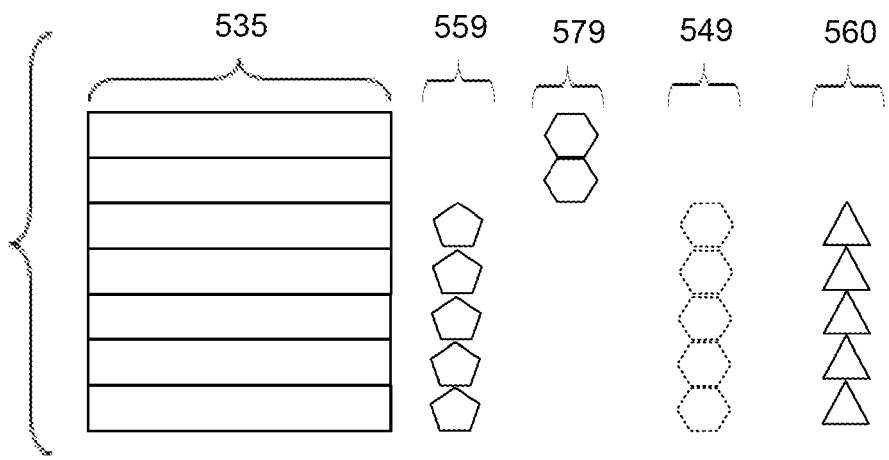
FIG. 17 is a diagram showing a representation of an example dataset in a system for estimating less-than-critical resources and discrepancies between local estimates and more accurate estimates resulting from follow-up API calls to the OSP system that were produced for various relationship instances of the dataset, which is an improvement in automated computerized systems, according to embodiments of the present disclosure.

FIG. 17 is a diagram showing a representation of an example dataset in a system for estimating less-than-critical resources and discrepancies between local estimates and more accurate estimates resulting from follow-up API calls to the OSP system that were produced for various relationship instances of the dataset, which is an improvement in automated computerized systems, according to embodiments of the present disclosure.

For example, the dataset 535 may be an example of dataset 135 of FIG. 3 and include data representing a set of sales transactions of client 193 with one or more customers, such as secondary entity 196. In the present example, more accurate sales tax estimates 579 are received for the first two transactions via a timely API call, such as API call 124 of FIG. 3. For the remaining five transactions, the client computer system 190 instead produces timely less accurate local estimates 559 of sales tax. For example, for the first two transactions, conditions were met according to the selected SCR of FIG. 12 for producing accurate sales tax estimates via a timely API call. However, for the remaining five transactions, conditions were not met according to the selected SCR of FIG. 12 for producing accurate sales tax estimates via a timely API call, so the client computer system 190 instead produced timely less accurate local estimates 559 of sales tax for those remaining five transactions.

Additionally, for the remaining five transactions, the client computer system 190 also produced more accurate estimates 549 via follow-up computer network calls, such as API call 124, to the OSP 198 as described above with reference to FIGS. 3, 4, 8 and 10. For the remaining five transactions, the client computer system 190 and/or OSP 198 also generated discrepancies 560 between local estimates 559 and more accurate estimates 549 resulting from follow-up API calls to the OSP 198. Using the discrepancies 560 computed as described with reference to FIG. 4 based on differences between the local estimates 559 and more accurate estimates 549, the client computer system 190 and/or computing system 195 may learn to improve certain values in the CVF 128 and/or CSVDR 170A based on historical discrepancies involving the use of certain values or parameters in the CVF 128 and/or digital rules in the CSVDR 170A.

In some embodiments, the client computer system 190 and/or computing system 195 determines the absolute value of each of these differences between the local estimates 559 and the corresponding more accurate estimates 549. If the client computer system 190 and/or computing system 195 determines this absolute value is less than a threshold for a state for very many of these differences (an amount which may be selectable by the client 193), then for datasets for that state, the client computer system 190 will produce the local estimate instead of producing the more accurate estimates 549 via API calls to the OSP 198. This process may be performed always as selected by the client 198, or at least during high traffic times of the network as defined, for example, according to the selections made in UI 7600 as described referencing FIG. 11 and/or UI 7400 as described referencing FIG. 12. In such embodiments, the option has been selected for the client computer system 190 to also produce more accurate estimates 549 via follow-up computer network calls, such as API call 124, to the OSP 198. Otherwise, correspondingly fewer options will be presented by the client computer system 190.

In some embodiments, if the client computer system 190 determines the local estimate of sales tax was higher than the resource determined by the more accurate estimate resulting from the follow-up API call to the OSP 198, the client computer system 190 then determines that the seller was charged more sales tax than was due. In such cases, the client computer system 190 can issue a refund to the buyer's credit card for the excess sales tax charged. Also, in some embodiments, if the client computer system 190 determines the local estimate of sales tax was lower than the resource determined by the more accurate estimate resulting from follow-up API call to the OSP 198, the client computer system 190 then determines the seller was charged less sales tax than was due. As a first option, the client 198 as the seller may swallow the loss (which may be negligible). As another option, the client computer system 190 may attempt to charge the credit card additional sales tax, but due to the reputational risk, the client computer system 190 may enable the client 198 to select the first option. With either option, the CCF 126 of the computer system 190 may adjust accordingly how the local estimate is to be computed going forward from the maximum and minimum tax rate as described herein.

Figure 18:
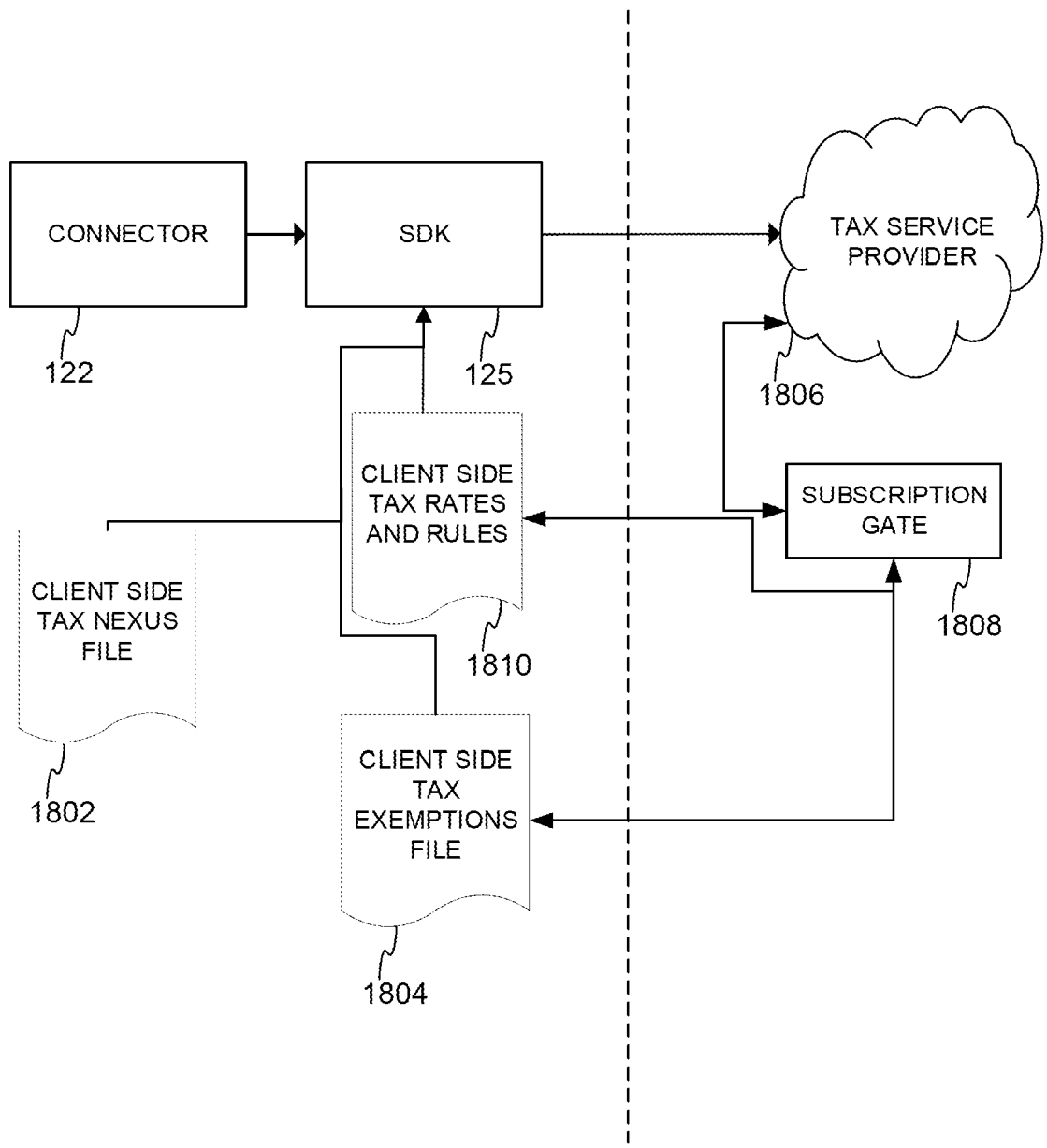
FIG. 18 is a diagram showing sample aspects of embodiments of a system for estimating less-than-critical resources in a use case of an embodiment that is an improvement in automated computerized systems, according to embodiments of the present disclosure.

FIG. 18 is a diagram showing sample aspects of embodiments of a system for estimating less-than-critical resources in a use case of an embodiment that is an improvement in automated computerized systems, according to embodiments of the present disclosure.

Shown is a tax provider service 1806 (which may be an example of the OSP 198 of FIGS. 1-5). Also shown is the SDK 125 and the connector 122 of the client computer system 190 FIGS. 1-5 of client 193.

As part of the CSVDR 170A and/or the CVF 128 discussed with reference to FIGS. 1-5, the tax provider service 1806 may distribute the client side tax rates and rules 1810, the client side tax exemptions file 1804 and the client side tax nexus file 1802.

The client side tax rates and rules may include, for example, but is not limited to, parameters, digital rules and values such as: transaction tax rates; particular types of transaction tax rates (e.g., a sales tax rates, service tax rates, use tax rates, electronic waste recycling (eWaste) fees, etc.); zip codes corresponding to particular transaction tax rates; tax jurisdictions corresponding to particular transaction tax rates; the highest possible total collective transaction tax rate in a particular zip code or tax jurisdiction; the lowest possible total collective transaction tax rate in a particular zip code or tax jurisdiction; and digital rules for how and when to apply particular tax rates. Different tax rates and rules files may also be distributed for different types of taxes and associated locations, products or services that may trigger collection of those taxes.

The client side tax exemptions file 1804 may include, for example, but is not limited to, parameters, digital rules and values such as: particular products or services or types of products or services that are exempt from certain transaction taxes; particular locations, regions, zones, addresses, businesses and buildings that are exempt from certain transaction taxes; reasons for exemptions, particular types of businesses that are exempt from certain transaction taxes; and digital rules for how and when to apply tax exemptions. The client side tax exemptions file 1804 may also or instead include just an identifier of a company, such as that of the client 193, the associated state or tax jurisdiction associated with the company, and an exemption reason for that company.

A seller such as the client 193 may operate tax jurisdictions that it has a physical presence in, such as a main office, a distribution center or warehouse, an employee working remotely, and so on. Such ties with a tax jurisdiction establish a so-called physical nexus. However, a tax authority such as a state or even a city may set its own nexus rules for when a business is considered to be "engaged in business" with it, and therefore that business is subject to registration and collection of sales or other transaction taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions. The client side tax nexus file 1802 may include, for example, but is not limited to, parameters and values such as a binary indication of whether the client has established tax nexus in particular zip codes or tax jurisdictions. For example, if it has been determined the client has not established tax nexus in a particular zip code or tax jurisdiction, then the tax for a transaction in that zip code or tax jurisdiction may be estimated according to the CSVDR 170A to be zero. The client side tax nexus file 1802 may also or instead include just an identifier of a company, such as that of the client 193, and digital rules regarding establishing nexus in a particular state or other tax jurisdiction associated with the company.

The client side tax rates and rules 1810, the client side tax exemptions file 1804 and the client side tax nexus file 1802 are utilized by the SDK 125 to timely produce the local estimates of transaction taxes with the benefit of not having to make network calls to the tax service provider 1806. The client may have the option to implement the SDK 125 to use some or all of the client side tax rates and rules 1810, the client side tax exemptions file 1804 and the client side tax nexus file 1802, as applicable to the client's business, individual needs and types of transactions. In some instances the client may use the SDK 125 to implement a relational database leveraging common relationships between the client side tax rates and rules 1810, the client side tax exemptions file 1804 and the client side tax nexus file 1802 on which the production of local estimates of transactions taxes will be based. For example, the client side tax rates and rules 1810 and the client side tax nexus file 1802 may both be coarsely based on the zip code of the seller and/or buyer. Thus, if the client side tax nexus file 1802 indicates there has not been nexus established for a particular zip code, then the SDK 125 need not consult the client side tax rates and rules 1810 for a transaction in that zip code because the tax may be determined to be zero based solely on the client not having established nexus in the particular zip code.

The client side tax rates and rules 1810, the client side tax exemptions file 1804 and the client side tax nexus file 1802 may be distributed by the tax service provider in a number of ways, including, but not limited to, leveraging a function of the SDK 125 via connector 122 or calling an API of the subscription gate 1808 directly. The distribution may be periodic, with updates. In some embodiments, the SDK 125 requests from the tax service provider 1806, through the subscription gate 1808, the client side tax rates and rules 1810, the client side tax exemptions file 1804 and/or the client side tax nexus file 1802. In other embodiments, the tax service provider 1806 pushes out such data per instructions, automatically, periodically, even daily, especially during times of low network traffic, or in response to a change in the tax rate or, tax rules or other applicable tax-related information. In some cases, the service provider 1806 pushing out such data in response to such changes may be advantageous because it prevents the connector 122 of the SDK 125 making un-necessary calls to the tax service provider 1806 to pull the same data, especially if it hasn't changed. Another advantage is that the information contained in the client side tax rates and rules 1810, the client side tax exemptions file 1804 and/or the client side tax nexus file 1802 being on the client side is not subject to the vagaries of needing internet access to produce estimates of transaction taxes.

FIG. 19 is a diagram showing example of parameters and associated parameter values 1900 that may be included in a CVF of a system for estimating less-than-critical resources that is an improvement in automated computerized systems, according to embodiments of the present disclosure.

For example, the CVF 128 described with respect to FIGS. 2-5 may include values for a zip code parameter 1902, a state parameter 1904, and an applicable resource rate parameter (e.g., tax rate) for that zip code in that state. Although transaction tax rates are not generally determined per zip code, the zip code and associated tax rate indicated in the CVF may be used as a coarse way for the CCF 126 to use CSVDR 170A to estimate the transaction tax for a particular transaction occurring in (i.e., the seller located in and/or the recipient receiving goods in) a particular zip code without having to make network calls to the OSP 198. In various embodiments, the parameters and associated parameter values 1900 may be included in the distributed client side tax rates and rules 1810 of FIG. 18. Different tables, data structures or files may be included in different CVFs for different types of transaction taxes with different parameters applicable to the different types of transaction taxes.

FIG. 20 is a diagram showing another example of parameters and associated parameter values 2000 that may be included in a CVF of a system for estimating less-than-critical resources that is an improvement in automated computerized systems, according to embodiments of the present disclosure.

For example, instead of including a single resource rate parameter (e.g., tax rate) for the zip code in a particular state, the CVF 128 described with respect to FIGS. 2-5 may include a high resource rate value 2002 (e.g., the highest possible total collective transaction tax rate that could exist in the zip code) and a low resource rate value 2004 (e.g., the lowest possible total collective transaction tax rate that could exist in the zip code). The CCF 126 may use CSVDR 170A to estimate the transaction tax based on the high resource rate value 2002 and/or low resource rate value 2004 in a manner selectable by the client 193 by using the SDK 125. For example, this may be by averaging the high resource rate value 2002 and/or low resource rate value 2004 (or estimated taxes resulting from using those rates), by selecting either the high resource rate value 2002 and/or low resource rate value 2004, or based on a selected risk tolerance of the client, such as described with respect to FIG. 9.

The CVF 128 described with respect to FIGS. 2-5 may also include a nexus indicator 1006 that indicates whether the client has established nexus in the particular zip code 1902, or in a tax jurisdiction within or overlapping the associated zip code 1902. In various embodiments, the determination whether the client has established nexus in the particular zip code 1902 may be made by the client 193 and/or the service engine 183 of the OSP 198. For example, the service engine 183 of the OSP 198 may whether the client has established nexus in the particular zip code 1902 and include this indication in the CVF 128 and/or the client side tax nexus file 1802 transmitted to the client 198 in a number of ways, including, but not limited to, leveraging a function of the SDK 125 via connector 122 or calling an API of the subscription gate 1808 directly. In some embodiments, the OSP may have previously communicated ti the client 198 a determination of whether the client has established nexus in the particular tax jurisdiction associated with the particular zip code 1902. For example, if it has been determined the client has not established tax nexus in a particular zip code (e.g., zip code 85001 as indicated in the example of parameters and associated parameter values 2000) or tax jurisdiction, then the tax for a transaction in that zip code or tax jurisdiction may be estimated according to the CSVDR 170A to be zero.

In some embodiments, the CVF 128 described with respect to FIGS. 2-5 may also include tax exemption data to improve the accuracy and usefulness of the tax estimate produced locally. The tax exemption data may include for example, but is not limited to, parameters, digital rules and values such as: particular products or services or types of products or services that are exempt from certain transaction taxes; particular locations, regions, zones, addresses, businesses and buildings that are exempt from certain transaction taxes; particular types of businesses that are exempt from certain transaction taxes; and digital rules for how and when to apply tax exemptions.

In various embodiments, there may also be additional capacities provided by the CVF 128, for example if there are additional variables in the CVF 128, which the estimate CSVDR 170A do or do not consider. Such functionality may be implemented directly into the connector 122 or consumed as part of the SDK 125. For example, the additional variables for the SDK 125 to consume via the new local estimate function may include either a yes/no variable indicating whether to perform the local estimate at all or a yes/no variable to indicate to perform the local estimate only if the client computer system 190 cannot connect to the OSP 198. For example, the configuration and selection of such variables may be controllable via implementation of the SDK 125.

In some embodiments, the CVF 128 described with respect to FIGS. 2-5 may also include a tax rate of the most populated area of the given zip code. The CCF 126 may then determine that if the combined tax rate of the most populated area of the given zip code is +/−0.5% of the highest combined rate overall of the zip code, then the CCF 126 will call the OSP 198 dynamically via API to produce a more accurate estimate calculation instead of producing the estimate of the tax locally. Also, if highest combined rate of the zip code is equal to or greater than 1% more than the lowest combined rate of the zip code based on the values in the CVF 128, then the CCF 126 may use the highest combined rate for the zip code.

In some embodiments, the OSP 198 and/or local client computer 190 may keep track of where (e.g., zip code, region, or tax jurisdiction) the most popular calls for tax estimation are for. Accordingly, OSP 198 provides area files, the minimum tax rate for that area (e.g., 6%), the maximum tax rate for that area (e.g., 8%) and the tax rate most likely applicable to that area based on the tracked data (e.g., most likely 7.4%).

In some embodiments, instead of or in addition to a minimum and maximum estimated tax amount, the estimate of the tax returned may include a single answer with a percentage confidence. For example, a local estimate of the tax may be returned by the CCF 126, along with a parameter indicating how accurate the estimate likely is (e.g., an estimated tax with a +/−2% confidence level, using a high tax rate of 0.086 and a low tax rate of 0.065).

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++,C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computer system of a client entity that is configured to cooperate with an online service platform (OSP), the method including:
storing locally on a storage medium of the computer system a client computing facility (CCF) that includes digital rules;
receiving, from the OSP across a network, a coarse values file (CVF) that includes values;
generating a dataset that represents a relationship instance of the client entity with another entity;
producing locally, by one or more processors of the computer system of the client entity and the digital rules of the CCF and the values of the CVF, an estimate of a resource for the dataset; and
outputting the estimate to a local output device of the computer system in conjunction with the dataset;
wherein:
the dataset indicates a set of transactions between the client entity and the another entity; and
the estimate of the resource for the dataset indicates an estimated burden on the another entity due to the set of transactions.

2. The method of claim 1 further including:
receiving, from the OSP across the network, an updated CVF that includes updated values;
storing locally on the storage medium the updated CVF to replace the CVF;
producing, by the digital rules of the CCF and the updated values of the updated CVF, an additional estimate of a resource for the dataset; and
outputting the additional estimate to the local output device in conjunction with the dataset.

3. The method of claim 1 further including:
determining whether producing the estimate of the resource for the dataset has been enabled by the CCF, in which the producing of the estimate is performed if it is determined producing the estimate of the resource for the dataset has been enabled; and
if it is determined producing the estimate of the resource for the dataset has not been enabled, then, instead of producing the estimate:
producing, via one or more computer network calls to an online service platform (OSP) system, a more accurate estimate of the resource that is more accurate than the estimate based on the dataset and digital rules stored remotely at the OSP system;
receiving the more accurate estimate from the OSP system; and
outputting the more accurate estimate to the local output device in conjunction with the dataset.

4. The method of claim 3 further including:
presenting a selection of options via a graphical user interface (GUI), in which the options include, for the dataset, one or more of: producing the estimate and receiving the more accurate estimate; and
receiving a selection of the options, in which the producing the estimate and the producing the more accurate estimate is based on the selection.

5. The method of claim 3 in which the CVF values include values for a plurality of parameters that are used to produce the estimate and the plurality of parameters that are used to produce the estimate include fewer parameters than used by the OSP to produce the more accurate estimate.

6. The method of claim 1 further including:
after producing the estimate, transmitting a follow-up computer network call to the OSP system to produce a more accurate estimate of the resource that is more accurate than the estimate based on the dataset and digital rules stored remotely at the OSP system; and
in response to the transmitting the follow-up computer network call to the OSP system, receiving the more accurate estimate from the OSP system.

7. The method of claim 6 in which the estimate is transmitted to the OSP for reconciliation with the more accurate estimate to find discrepancies between the estimate and the more accurate estimate.

8. The method of claim 6 further including:
reconciling the estimate with the more accurate estimate to find discrepancies between the estimate and the more accurate estimate.

9. The method of claim 6 further including:
computing differences between the estimate and the more accurate estimate; and
recording the differences between the estimate and the more accurate estimate.

10. The method of 9 further including:
electronically issuing one or more resource refunds based on the differences between the estimate and the more accurate estimate.

11. The method of claim 6 further including:
receiving input indicating scheduling of the follow-up computer network call to the OSP system; and
performing the follow-up computer network call to the OSP system according to the input indicating the scheduling.

12. The method of claim 11 in which receiving input indicating scheduling of the follow-up computer network call to the OSP indicates that follow-up computer network call to the OSP is to occur based on internet response times exceeding one or more thresholds.

13. The method of claim 1 further including:
determining whether selectable conditions are met in which to produce a more accurate estimate of the resource via one or more computer network calls to an online service platform (OSP) system; and
in response to determining that the selectable conditions are met, producing, via one or more computer network calls to the OSP system, the more accurate estimate based on the dataset.

14. The method of claim 1 in which the operations further include:
before receiving the CVF, receiving, from the OSP system, data comprising the CCF.

15. The method of claim 14 in which the CCF is received from the OSP system as part of a software development kit (SDK).

16. The method of claim 1 in which:
the CCF is part of a development kit (SDK) residing on the computer system; and further including receiving the CVF from the OSP system by leveraging a function of the SDK.

17. The method of claim 1 further including receiving the CVF from the OSP system by making a computer network call to a CVF subscription application programming interface (API).

18. The method of claim 17 in which the CCF includes client-side versions of digital rules (CSVDRs) residing on the computer system that use the CVF data to produce the estimate.

19. The method of claim 1 further including:
determining, by consulting a flag value, whether to produce the estimate of the resource for the dataset instead of producing a more accurate estimate, in which the more accurate estimate is produced via one or more computer network calls to an online service platform (OSP) system and is more accurate than the estimate based on the dataset and digital rules stored remotely at the OSP system.

20. The method of claim 1 further including:
receiving a signal from the OSP system;
setting a flag value to indicate whether producing a more accurate estimate via one or more computer network calls to an online service platform (OSP) system is allowed, in which the more accurate estimate is more accurate than the estimate based on the dataset and on digital rules stored remotely at the OSP system;
producing, via one or more computer network calls to the OSP system, the more accurate estimate if particular selectable conditions in which to produce the more accurate estimate are met and the flag value indicates that producing the more accurate estimate via one or more computer network calls to the OSP system is allowed; and
producing the estimate instead of the more accurate estimate if the flag value indicates that producing the more accurate estimate via one or more computer network calls to the OSP system is not allowed.

21. The method of claim 20 in which the signal from the OSP system is a warning of a potential service interruption of the OSP system and, in response to the signal, the flag value is set to indicate that producing the more accurate estimate via one or more computer network calls to the OSP system is not allowed.

22. The method of claim 21 further including:
receiving an all clear signal from the OSP system clearing the warning of the potential service interruption; and
in response to receiving the all clear signal, changing the flag value to indicate that producing the more accurate estimate via one or more computer network calls to the OSP system is allowed again.

23. The method of claim 1 further including:
presenting a selectable option via a graphical user interface (GUI) to select a degree of risk between a lower risk estimate and a higher risk estimate; and
receiving input indicating a selection of the degree of risk between the lower risk estimate and the higher risk estimate, in which the producing the estimate includes:
producing, by the digital rules of the CCF and the values of the CVF, the estimate based on the selection of the degree of risk between the lower risk estimate and the higher risk estimate.

* * * * *